US008493821B1

(12) United States Patent
Sasaki et al.

(10) Patent No.: US 8,493,821 B1
(45) Date of Patent: Jul. 23, 2013

(54) THERMALLY-ASSISTED MAGNETIC RECORDING HEAD INCLUDING A SHIELD

(71) Applicants: Yoshitaka Sasaki, Santa Clara, CA (US); Hiroyuki Ito, Milpitas, CA (US); Hironori Araki, Milpitas, CA (US); Shigeki Tanemura, Milpitas, CA (US); Kazumasa Yasuda, Sunnyvale, CA (US); Ryuji Fujii, Hong Kong (CN)

(72) Inventors: Yoshitaka Sasaki, Santa Clara, CA (US); Hiroyuki Ito, Milpitas, CA (US); Hironori Araki, Milpitas, CA (US); Shigeki Tanemura, Milpitas, CA (US); Kazumasa Yasuda, Sunnyvale, CA (US); Ryuji Fujii, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/622,249

(22) Filed: Sep. 18, 2012

Related U.S. Application Data

(63) Continuation-in-part of application No. 13/408,583, filed on Feb. 29, 2012, now abandoned.

(51) Int. Cl.
*G11B 11/00* (2006.01)

(52) U.S. Cl.
USPC ..................... 369/13.33; 369/13.13

(58) Field of Classification Search
USPC ........ 369/13.33, 13.13, 13.32, 13.02, 112.09, 369/112.14, 112.21, 112.27, 300; 360/59; 385/129; 29/603.07–603.27; 250/201.3, 201.5
See application file for complete search history.

(56) References Cited

U.S. PATENT DOCUMENTS

| | | | |
|---|---|---|---|
| 8,036,069 B1* | 10/2011 | Jin et al. | 369/13.32 |
| 8,107,352 B1* | 1/2012 | Yamanaka et al. | 369/112.27 |
| 2007/0165494 A1* | 7/2007 | Cho et al. | 369/13.32 |
| 2008/0151427 A1* | 6/2008 | Poon et al. | 360/235.4 |
| 2009/0262608 A1* | 10/2009 | Kurita et al. | 369/13.33 |
| 2011/0058272 A1 | 3/2011 | Miyauchi et al. | |

* cited by examiner

*Primary Examiner* — Tan X Dinh
(74) *Attorney, Agent, or Firm* — Oliff & Berridge, PLC

(57) ABSTRACT

A thermally-assisted magnetic recording head includes: a main pole having an end face located in a medium facing surface; a waveguide; a plasmon generator having a near-field light generating part located in the medium facing surface; and a shield located on the rear side in the direction of travel of a recording medium with respect to the main pole. The shield has an end face located in the medium facing surface and lying on the rear side in the direction of travel of the recording medium with respect to the end face of the main pole. The end face of the main pole and the end face of the shield are at a distance of 50 to 300 nm from each other. The near-field light generating part is located between the end face of the main pole and the end face of the shield in the medium facing surface.

14 Claims, 22 Drawing Sheets

THERMALLY-ASSISTED MAGNETIC RECORDING HEAD INCLUDING A SHIELD

This is a Continuation-in-Part of U.S. patent application Ser. No. 13/408,583 filed Feb. 29, 2012. The disclosure of the prior application is hereby incorporated by reference herein in its entirety.

BACKGROUND OF THE INVENTION

1. Field of the Invention

The present invention relates to a thermally-assisted magnetic recording head for use in thermally-assisted magnetic recording where a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the recording medium. The slider has a medium facing surface that faces the recording medium. The medium facing surface has an air inflow end (a leading end) and an air outflow end (a trailing end).

Here, the side of positions closer to the leading end relative to a reference position will be defined as the leading side, and the side of positions closer to the trailing end relative to the reference position will be defined as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near the medium facing surface of the slider.

U.S. Patent Application Publication No. 2011/0058272 A1 discloses a technology in which the surface of the core of the waveguide and the surface of the plasmon generator are arranged to face each other with a gap therebetween, so that evanescent light that occurs from the surface of the core based on the light propagating through the core is used to excite surface plasmons on the plasmon generator to generate near-field light based on the excited surface plasmons.

A thermally-assisted magnetic recording head that employs a plasmon generator as a source of generation of near-field light is configured so that the write head section includes a main pole, which produces a write magnetic field, and the plasmon generator. The main pole has an end face located in the medium facing surface. The plasmon generator has a near-field light generating part located in the medium facing surface. For the thermally-assisted magnetic recording head, it is demanded that the end face of the main pole and the near-field light generating part of the plasmon generator be located in close proximity to each other.

To increase the linear recording density of a magnetic recording device, it is effective to use a perpendicular magnetic recording system in which the direction of magnetization of signals to be written on tracks of the recording medium is perpendicular to the plane of the recording medium. It is also effective to increase, on the tracks, the gradient of the change in write magnetic field intensity with respect to the change in position along the direction in which the tracks extend, i.e., the direction along the tracks (this gradient will hereinafter be referred to as the write field intensity gradient). These also apply to a magnetic recording device that employs thermally-assisted magnetic recording.

U.S. Patent Application Publication No. 2011/0058272 A1 discloses a technology for increasing the write field intensity gradient by providing a bottom shield on the leading side of the main pole, the bottom shield having an end face located in the medium facing surface. In the thermally-assisted magnetic recording head disclosed in this publication, however, there is a relatively large distance between the end face of the bottom shield and the end face of the main pole in the medium facing surface because the waveguide (core) and the plasmon generator are interposed between the bottom shield and the main pole. This thermally-assisted magnetic recording head therefore has a disadvantage in that it is difficult for the bottom shield to exert its function satisfactorily.

OBJECT AND SUMMARY OF THE INVENTION

It is an object of the present invention to provide a thermally-assisted magnetic recording head including a main pole, a plasmon generator, a waveguide, and a shield, the thermally-assisted magnetic recording head being capable of providing increased linear recording density.

A thermally-assisted magnetic recording head of a first aspect of the present invention includes: a medium facing surface that faces a recording medium; a main pole; a waveguide; a plasmon generator; and a first shield. The main pole has an end face located in the medium facing surface and produces a write magnetic field for writing data on the recording medium. The waveguide includes a core through which light propagates, and a cladding that surrounds the core. The plasmon generator has a near-field light generating part located in the medium facing surface, and is configured so that a surface plasmon is excited on the plasmon generator based on the light propagating through the core, and the near-field light generating part generates near-field light based on the surface plasmon. The first shield is made of a magnetic material and located on a rear side in the direction of travel of the recording medium relative to the main pole.

The first shield has: an end face that is located in the medium facing surface and lies on the rear side in the direction of travel of the recording medium relative to the end face of the main pole; and a top surface facing toward the main pole. The end face of the main pole and the end face of the first shield are at a distance of 50 to 300 nm from each other. The near-field light generating part is located between the end face of the main pole and the end face of the first shield in the medium facing surface. At least part of the plasmon generator is present between the top surface of the first shield and the main pole, whereas no part of the core is present therebetween.

In the thermally-assisted magnetic recording head of the first aspect of the present invention, the end face of the main pole and the end face of the first shield may be at a distance of 50 to 100 nm from each other.

The thermally-assisted magnetic recording head of the first aspect of the present invention may further include: a coil that produces a magnetic field corresponding to the data; and a first return path section that is made of a magnetic material and allows a magnetic flux corresponding to the magnetic field produced by the coil to pass, the first return path section connecting the main pole and the first shield to each other so that a space is defined by the main pole, the first shield and the first return path section to allow a part of the coil to pass through the space.

In the thermally-assisted magnetic recording head of the first aspect of the present invention, the core may have an evanescent light generating surface that generates evanescent light based on the light propagating through the core, and the plasmon generator may have a plasmon exciting part that faces the evanescent light generating surface with a predetermined spacing therebetween. In this case, the plasmon generator is configured so that a surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

The plasmon generator may be greater than the top surface of the first shield in length in a direction perpendicular to the medium facing surface. The core may be disposed at such a position that the first shield is interposed between the core and the medium facing surface. The evanescent light generating surface and the plasmon exciting part may be located farther from the medium facing surface than is the top surface of the first shield. Alternatively, the core may be disposed at such a position that the main pole is interposed between the core and the medium facing surface.

The thermally-assisted magnetic recording head of the first aspect of the present invention may further include a second shield made of a magnetic material, the second shield having an end face that is located in the medium facing surface and lies on a front side in the direction of travel of the recording medium relative to the end face of the main pole. In this case, the thermally-assisted magnetic recording head may further include: a coil that produces a magnetic field corresponding to the data; and a first return path section and a second return path section each of which is made of a magnetic material and allows a magnetic flux corresponding to the magnetic field produced by the coil to pass. The first return path section connects the main pole and the first shield to each other so that a first space is defined by the main pole, the first shield and the first return path section to allow a part of the coil to pass through the first space. The second return path section connects the main pole and the second shield to each other so that a second space is defined by the main pole, the second shield and the second return path section to allow another part of the coil to pass through the second space.

A thermally-assisted magnetic recording head of a second aspect of the present invention includes: a medium facing surface that faces a recording medium; a main pole; a waveguide; a plasmon generator; and a shield. The main pole has an end face located in the medium facing surface and produces a write magnetic field for writing data on the recording medium. The waveguide includes a core through which light propagates, and a cladding that surrounds the core. The plasmon generator has a near-field light generating part located in the medium facing surface, and is configured so that a surface plasmon is excited on the plasmon generator based on the light propagating through the core, and the near-field light generating part generates near-field light based on the surface plasmon. The shield is made of a magnetic material and located on a front side in the direction of travel of the recording medium relative to the main pole.

The main pole further has a top surface facing toward the shield. The shield has an end face that is located in the medium facing surface and lies on the front side in the direction of travel of the recording medium relative to the end face of the main pole. The end face of the main pole and the end face of the shield are at a distance of 50 to 300 nm from each other. The near-field light generating part is located between the end face of the main pole and the end face of the shield in the medium facing surface. At least part of the plasmon generator is present between the top surface of the main pole and the shield, whereas no part of the core is present therebetween.

In the thermally-assisted magnetic recording head of the second aspect of the present invention, the end face of the main pole and the end face of the shield may be at a distance of 50 to 100 nm from each other.

The thermally-assisted magnetic recording head of the second aspect of the present invention may further include: a coil that produces a magnetic field corresponding to the data; and a return path section that is made of a magnetic material and allows a magnetic flux corresponding to the magnetic field produced by the coil to pass, the return path section connecting the main pole and the shield to each other so that a space is defined by the main pole, the shield and the return path section to allow a part of the coil to pass through the space.

In the thermally-assisted magnetic recording head of the second aspect of the present invention, the core may have an evanescent light generating surface that generates evanescent light based on the light propagating through the core, and the plasmon generator may have a plasmon exciting part that faces the evanescent light generating surface with a predetermined spacing therebetween. In this case, the plasmon generator is configured so that a surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

The plasmon generator may be greater than the top surface of the main pole in length in a direction perpendicular to the medium facing surface. The core may be disposed at such a position that the main pole is interposed between the core and the medium facing surface. The evanescent light generating surface and the plasmon exciting part may be located farther from the medium facing surface than is the top surface of the main pole. Alternatively, the core may be disposed at such a position that the shield is interposed between the core and the medium facing surface.

In the thermally-assisted magnetic recording head of the first aspect of the present invention, at least part of the plasmon generator is present between the top surface of the first shield and the main pole, whereas no part of the core is present therebetween. The present invention thus allows the end face of the main pole and the end face of the first shield to be brought into close proximity to each other easily so that the distance between the end face of the main pole and the end face of the first shield falls within the range of 50 to 300 nm. Consequently, according to the present invention, it is possible to increase the write field intensity gradient by virtue of the function of the first shield. In the present invention, the near-field light generating part is located in the medium facing surface at the position between the end face of the main pole and the end face of the first shield. This makes it possible to produce a write magnetic field of a large write field intensity gradient in the vicinity of the near-field light generating part. According to the present invention, it is therefore possible to increase the linear recording density.

In the thermally-assisted magnetic recording head of the second aspect of the present invention, at least part of the plasmon generator is present between the top surface of the main pole and the shield, whereas no part of the core is present therebetween. The present invention thus allows the end face of the main pole and the end face of the shield to be brought into close proximity to each other easily so that the distance between the end face of the main pole and the end face of the shield falls within the range of 50 to 300 nm. Consequently, according to the present invention, it is possible to increase the write field intensity gradient by virtue of the function of the shield. In the present invention, the near-field light generating part is located in the medium facing surface at the position between the end face of the main pole and the end face of the shield. This makes it possible to produce a write magnetic field of a large write field intensity gradient in the vicinity of the near-field light generating part. According to the present invention, it is therefore possible to increase the linear recording density.

Other and further objects, features and advantages of the present invention will appear more fully from the following description.

DETAILED DESCRIPTION OF THE PREFERRED EMBODIMENTS

First Embodiment

Figure 1:
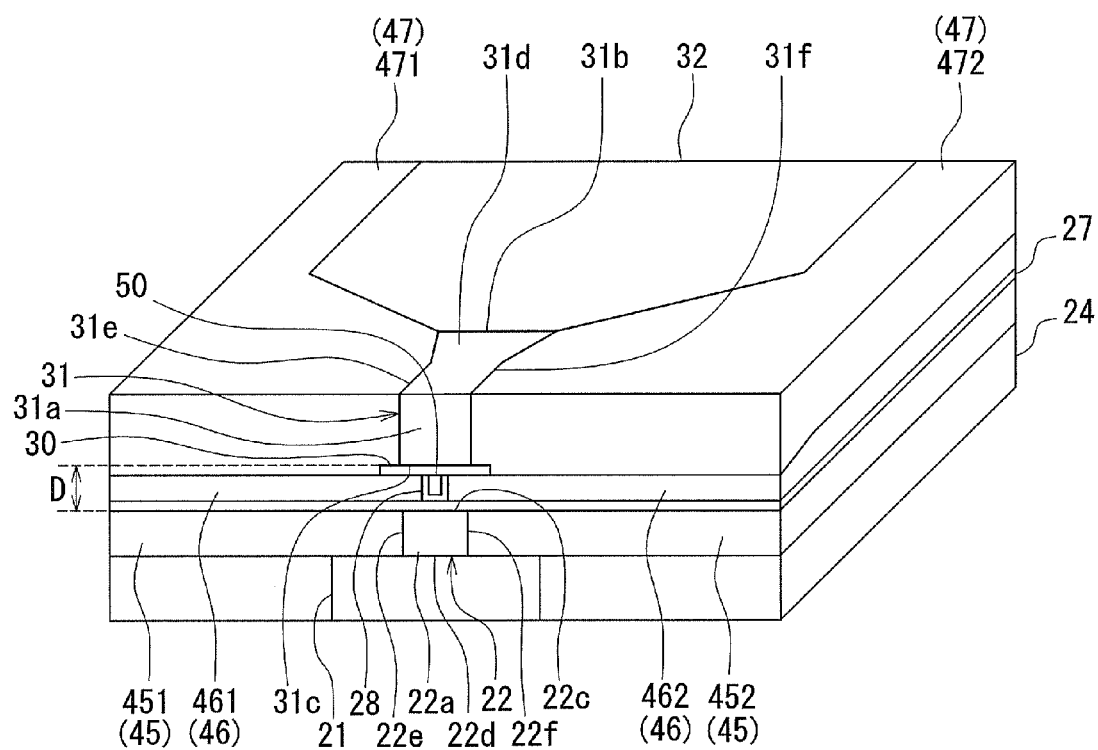
FIG. 1 is a perspective view showing the main part of a thermally-assisted magnetic recording head according to a first embodiment of the invention.
Figure 1:
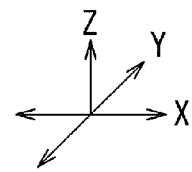
Figure 2:
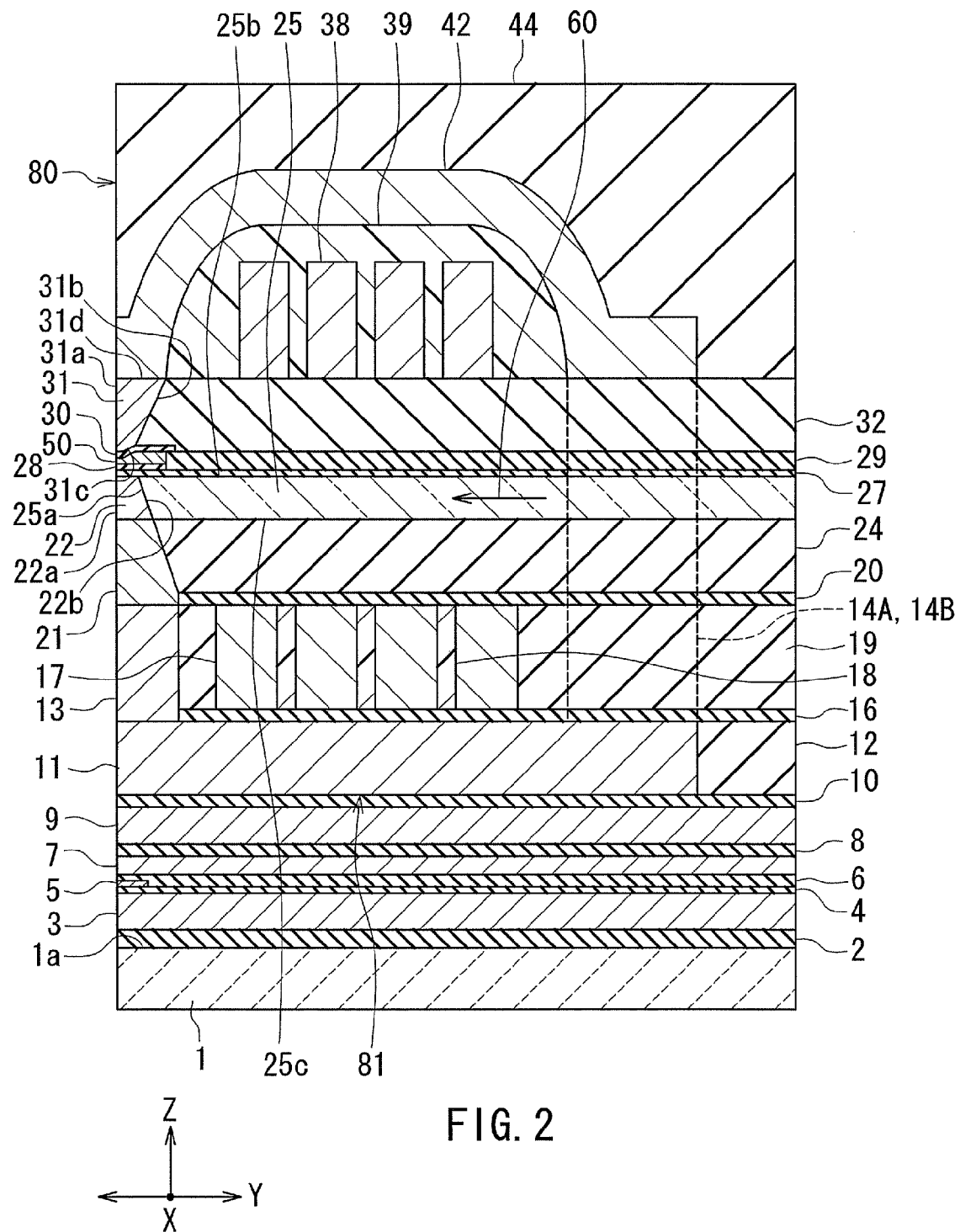
FIG. 2 is a cross-sectional view showing the configuration of the thermally-assisted magnetic recording head according to the first embodiment of the invention.
Figure 3:
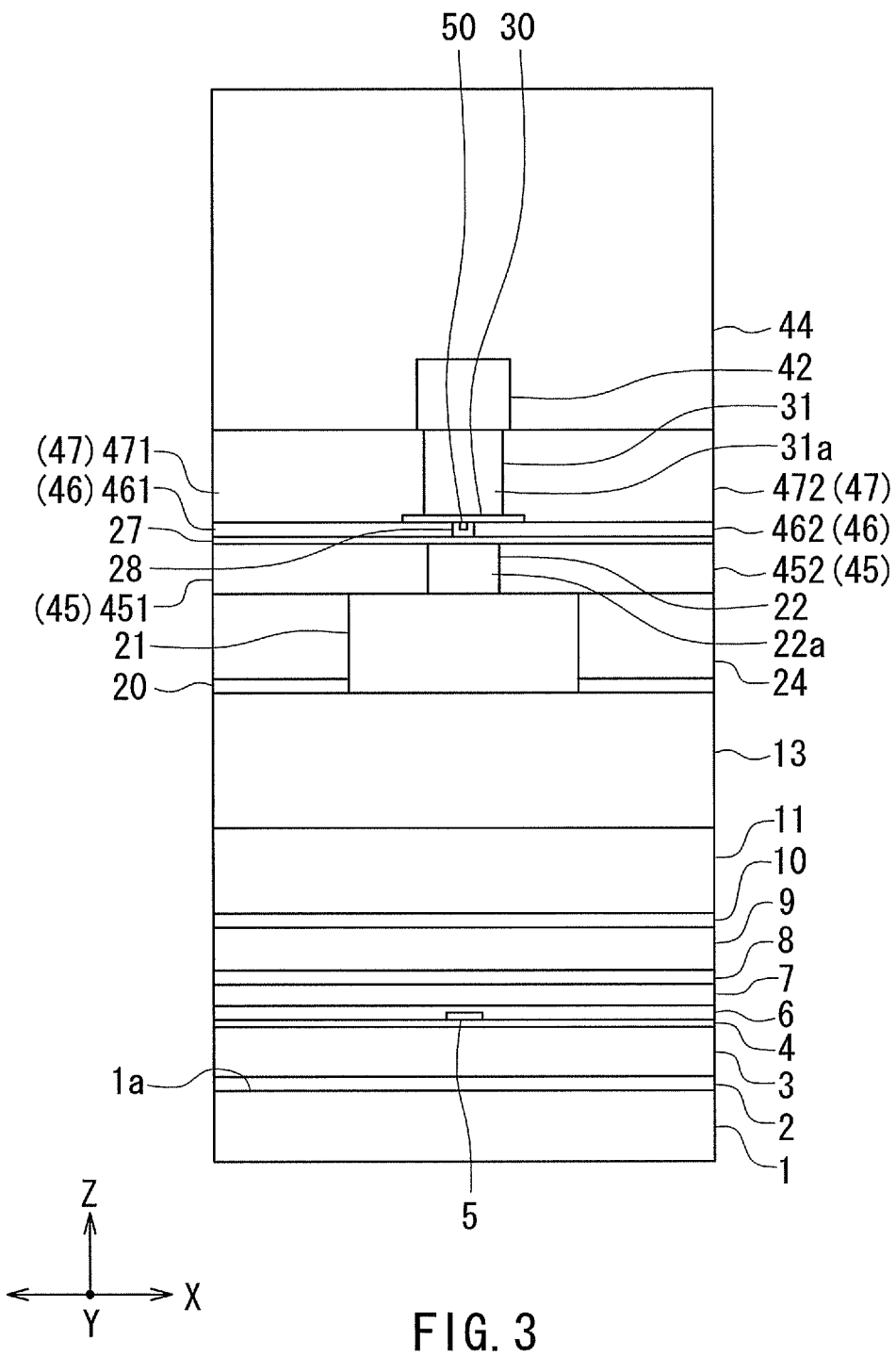
FIG. 3 is a front view showing the medium facing surface of the thermally-assisted magnetic recording head according to the first embodiment of the invention.
Figure 4:
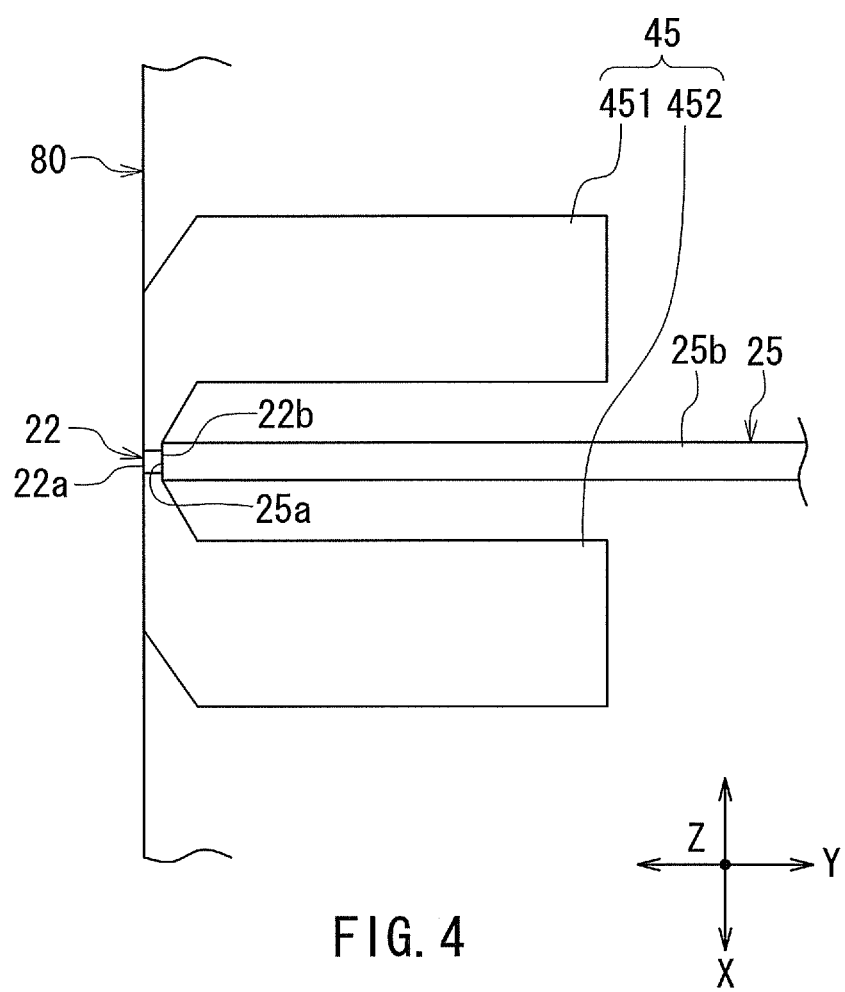
FIG. 4 is a plan view showing a core and a first shield of the first embodiment of the invention.
Figure 5:
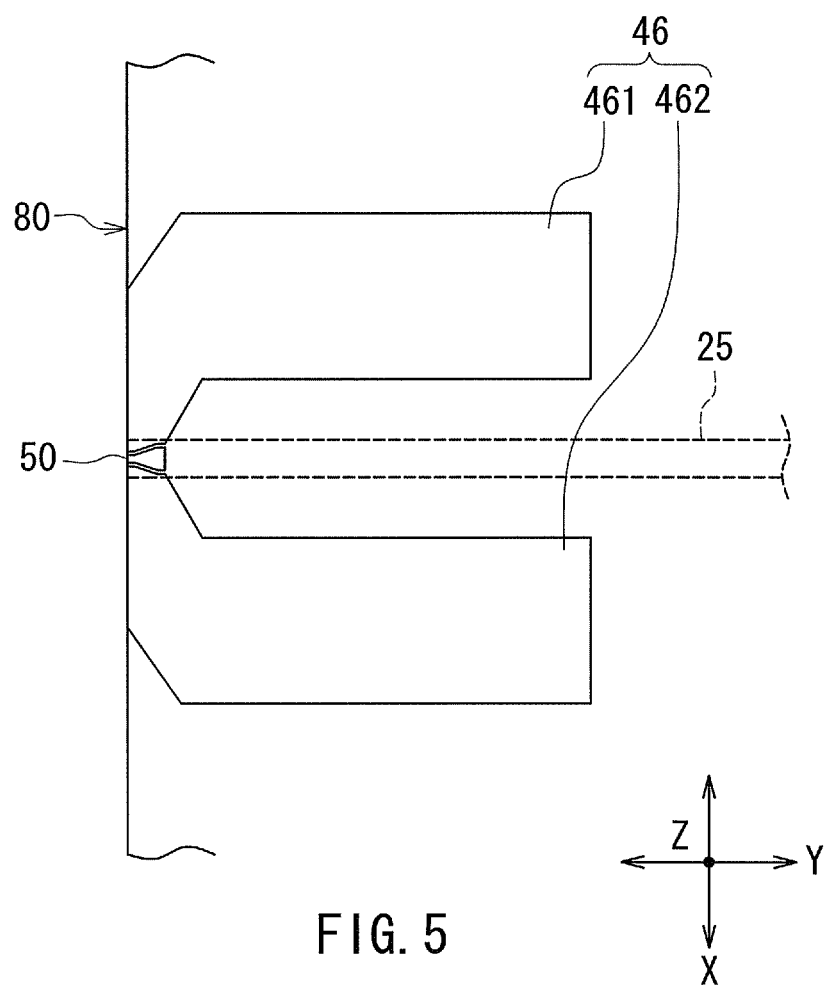
FIG. 5 is a plan view showing a plasmon generator of the first embodiment of the invention.
Figure 6:
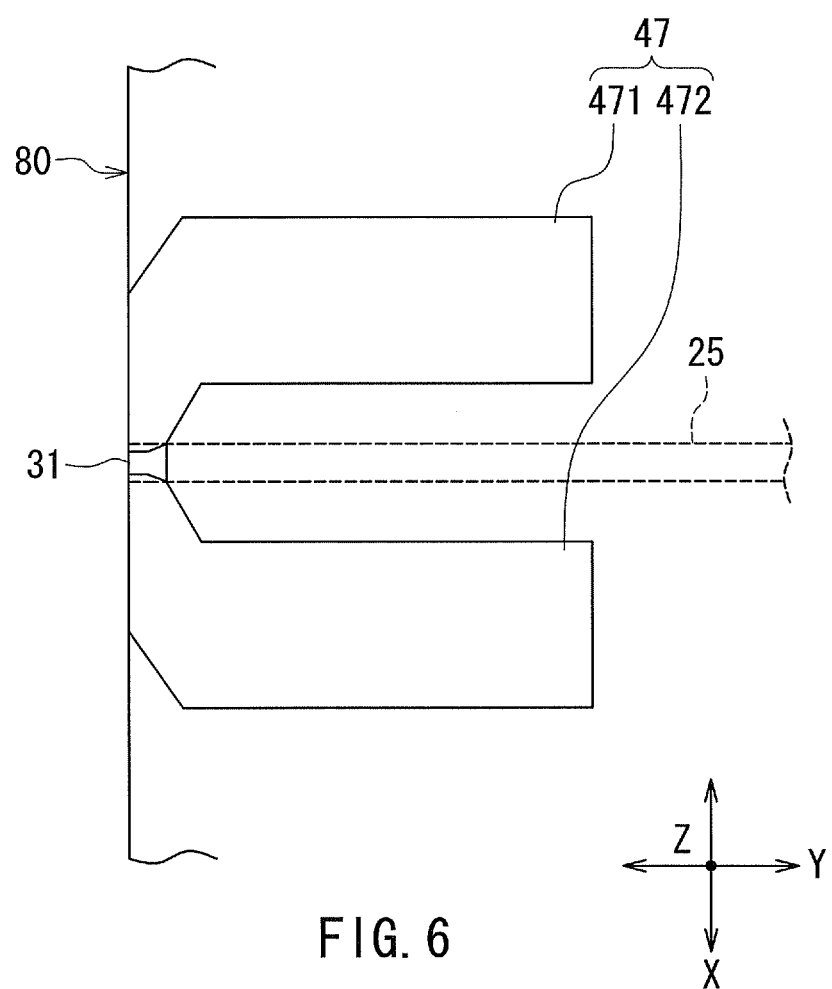
FIG. 6 is a plan view showing a main pole of the first embodiment of the invention.

Preferred embodiments of the present invention will now be described in detail with reference to the drawings. First, reference is made to FIG. 1 to FIG. 6 to describe the configuration of a thermally-assisted magnetic recording head according to a first embodiment of the invention. FIG. 1 is a perspective view showing the main part of the thermally-assisted magnetic recording head. FIG. 2 is a cross-sectional view showing the configuration of the thermally-assisted magnetic recording head. FIG. 3 is a front view showing the medium facing surface of the thermally-assisted magnetic recording head. FIG. 4 is a plan view showing a core and a first shield. FIG. 5 is a plan view showing a plasmon generator. FIG. 6 is a plan view showing a main pole.

The thermally-assisted magnetic recording head according to the present embodiment is for use in perpendicular magnetic recording, and is in the form of a slider to fly over the surface of a recording medium that rotates. When the recording medium rotates, an airflow passing between the recording medium and the slider causes a lift to be exerted on the slider. The slider is configured to fly over the surface of the recording medium by means of the lift.

As shown in FIG. 2, the thermally-assisted magnetic recording head has a medium facing surface 80 that faces the recording medium. Here, X direction, Y direction, and Z direction will be defined as follows. The X direction is the direction across the tracks of the recording medium, i.e., the track width direction. The Y direction is a direction perpendicular to the medium facing surface 80. The Z direction is the direction of travel of the recording medium as viewed from the slider. The X, Y, and Z directions are orthogonal to one another.

As shown in FIG. 2 and FIG. 3, the thermally-assisted magnetic recording head includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a bottom shield layer 3 made of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not shown) connected to the MR element 5; a top shield gap film 6 which is an insulating film disposed on the MR element 5; and a top shield layer 7 made of a magnetic material and disposed on the top shield gap film 6. The Z direction is also a direction perpendicular to the top surface 1a of the substrate 1.

An end of the MR element 5 is located in the medium facing surface 80 facing the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head section. The thermally-assisted magnetic recording head further includes an insulating layer 8 disposed on the top shield layer 7, a middle shield layer 9 made of a magnetic material and disposed on the insulating layer 8, and a nonmagnetic layer 10 made of a nonmagnetic material and disposed on the middle shield layer 9. The insulating layer 8 and the nonmagnetic layer 10 are made of alumina, for example.

The thermally-assisted magnetic recording head further includes a return pole layer 11 made of a magnetic material and disposed on the nonmagnetic layer 10, and an insulating layer 12 disposed on the nonmagnetic layer 10 and surrounding the return pole layer 11. The return pole layer 11 has an end face located in the medium facing surface 80. The insulating layer 12 is made of alumina, for example.

The thermally-assisted magnetic recording head further includes: a coupling layer 13 disposed on the return pole layer 11 in the vicinity of the medium facing surface 80; two coupling portions 14A and 14B disposed away from the medium facing surface 80 and lying on part of the return pole layer 11; an insulating layer 16 disposed on another part of the return pole layer 11 and on the insulating layer 12; and a coil 17 disposed on the insulating layer 16. The coupling layer 13 and the coupling portions 14A and 14B are each made of a magnetic material. Each of the coupling portions 14A and 14B has a first layer located on the return pole layer 11, and a second, a third, and a fourth layer stacked in this order on the first layer. The first layer of the coupling portion 14A and the first layer of the coupling portion 14B are disposed to align in the track width direction (the X direction). The coil 17 is planar spiral-shaped and wound around the first layers of the coupling portions 14A and 14B. The coil 17 is made of a conductive material such as copper. The insulating layer 16 is made of alumina, for example.

The thermally-assisted magnetic recording head further includes an insulating layer 18 disposed in the space between every adjacent turns of the coil 17, an insulating layer 19 disposed around the coupling layer 13 and the coil 17, and an insulating layer 20 disposed over the coil 17 and the insulating layers 18 and 19. The insulating layer 18 is made of photoresist, for example. The insulating layers 19 and 20 are made of alumina, for example. The first layers of the coupling portions 14A and 14B are embedded in the insulating layers 16 and 19.

The thermally-assisted magnetic recording head further includes: a coupling layer 21 made of a magnetic material and disposed on the coupling layer 13; and a first shield 22 made of a magnetic material and disposed on the coupling layer 21. In the present embodiment, the first shield 22 is made of a magnetic metal material, in particular. The coupling layer 21 has: a first end face located in the medium facing surface 80; a second end face opposite to the first end face; a top surface; a bottom surface; and two side surfaces. The first shield 22 has: a first end face 22a located in the medium facing surface 80; a second end face 22b opposite to the first end face 22a; a top surface 22c; a bottom surface 22d; and two side surfaces 22e and 22f. The second end face 22b of the first shield 22 is inclined relative to the direction perpendicular to the top surface 1a of the substrate 1. The distance from the medium facing surface 80 to an arbitrary point on the second end face 22b of the first shield 22 decreases with increasing distance from the arbitrary point to the top surface 1a of the substrate 1. The second end face of the coupling layer 21 may be inclined relative to the direction perpendicular to the top surface 1a of the substrate 1 like the second end face 22b of the first shield 22. In this case, the second end face of the coupling layer 21 and the second end face 22b of the first shield 22 may be arranged to be contiguous with each other. The first shield 22 will be described in more detail later.

The thermally-assisted magnetic recording head further includes a nonmagnetic layer 45 having two portions 451 and 452 that are located on opposite sides of the first shield 22 in the track width direction (the X direction). Each of the portions 451 and 452 has: a front end face located in the medium facing surface 80; a side end face in contact with the first shield 22; a top surface; and a bottom surface. The nonmagnetic layer 45 is made of, for example, alumina, silicon dioxide ($SiO_2$), SiC, or AlN.

The thermally-assisted magnetic recording head further includes a waveguide including a core 25 and a cladding. The cladding surrounds the core 25. The core 25 has an end face 25a that is closer to the medium facing surface 80, and further has a top surface 25b and a bottom surface 25c. In the present embodiment, the core 25 is disposed at such a position that the first shield 22 is interposed between the core 25 and the medium facing surface 80. The end face 25a of the core 25 is in contact with the second end face 22b of the first shield 22. As shown in FIG. 4, parts of the two portions 451 and 452 of the nonmagnetic layer 45, the parts being apart from the medium facing surface 80, are located on opposite sides of the core 25 in the track width direction and are sufficiently spaced from the core 25 when viewed from above.

The cladding includes a first cladding layer 24, a second cladding layer, and a gap layer 27. The first cladding layer 24 is disposed on the insulating layer 20 and surrounds the coupling layer 21. The core 25 and the nonmagnetic layer 45 are disposed on the first cladding layer 24. Although not shown in the drawings, the second cladding layer is disposed on the first cladding layer 24 and surrounds the first shield 22, the core 25 and the nonmagnetic layer 45. The top surface 22c of the first shield 22, the top surface 25b of the core 25, the top surfaces of the two portions 451 and 452 of the nonmagnetic layer 45, and the top surface of the second cladding layer are even with each other. The gap layer 27 is disposed over these even top surfaces.

The core 25 is made of a dielectric material that transmits laser light to be used for generating near-field light. The laser light emitted from a not-shown laser diode enters the core 25 and propagates through the core 25. The core 25 has an evanescent light generating surface that generates evanescent light based on the light propagating through the core 25. In the present embodiment, the top surface 25b of the core 25 corresponds to the evanescent light generating surface according to the invention.

The first cladding layer 24, the second cladding layer, and the gap layer 27 are each made of a dielectric material that has a refractive index lower than that of the core 25. For example, the core 25 can be made of tantalum oxide such as $Ta_2O_5$ or silicon oxynitride (SiON), whereas the first cladding layer 24, the second cladding layer, and the gap layer 27 can be made of $SiO_2$ or alumina.

The second layers of the coupling portions 14A and 14B are embedded in the insulating layer 20 and the first cladding layer 24. The third layers of the coupling portions 14A and 14B are embedded in the second cladding layer. The third layer of the coupling portion 14A and the third layer of the coupling portion 14B are located on opposite sides of the core 25 in the track width direction (the X direction) and are each spaced from the core 25.

The thermally-assisted magnetic recording head further includes: a plasmon generator 50 disposed above the top surface 25b of the core 25 in the vicinity of the medium facing surface 80; a nonmagnetic layer 46 disposed on the gap layer 27 and having two portions 461 and 462 that are located on opposite sides of the plasmon generator 50 in the track width direction (the X direction); and an insulating film 28 disposed between the plasmon generator 50 and each of the nonmagnetic layer 46 and the gap layer 27. For example, the plasmon generator 50 is made of one of Au, Ag, Al, Cu, Pd, Pt, Rh and Ir, or of an alloy composed of two or more of these elements. The insulating film 28 is made of alumina, for example. The shape and location of the plasmon generator 50 will be described in detail later.

Each of the two portions 461 and 462 of the nonmagnetic layer 46 has: a front end face located in the medium facing surface 80; a side end face facing toward the plasmon generator 50; a top surface; and a bottom surface. As shown in FIG. 5, parts of the two portions 461 and 462 of the nonmagnetic layer 46, the parts being apart from the medium facing surface 80, are located on opposite sides of the core 25 in the track width direction and are sufficiently spaced from the core 25 when viewed from above.

The nonmagnetic layer 46 is made of, for example, alumina, $SiO_2$, SiC, or AlN. FIG. 1 to FIG. 3 and FIG. 5 illustrate an example in which the nonmagnetic layer 46 is made of SiC, in particular. Where the nonmagnetic layer 46 is made of alumina, $SiO_2$, or AlN, the insulating film 28 may be omitted. In this case, the nonmagnetic layer 46 may be in contact with the plasmon generator 50.

The thermally-assisted magnetic recording head further includes a dielectric layer 29 disposed on the gap layer 27 and surrounding the plasmon generator 50, the nonmagnetic layer 46 and the insulating film 28. The dielectric layer 29 is made of $SiO_2$, for example.

The thermally-assisted magnetic recording head further includes: a main pole 31 made of a magnetic material and disposed such that the plasmon generator 50 is interposed between the main pole 31 and the core 25; and a nonmagnetic layer 30 disposed between the plasmon generator 50 and the main pole 31. The nonmagnetic layer 30 is made of, for example, alumina, $SiO_2$, $3Al_2O_3$-$2SiO_2$ (mullite), $2MgO$—$SiO_2$ (forsterite), $MgO$—$SiO_2$ (steatite), or $ZrO_2$ (zirconia). The shape and location of the main pole 31 will be described in detail later.

The thermally-assisted magnetic recording head further includes a nonmagnetic layer 47 disposed on the nonmagnetic layer 46 and having two portions 471 and 472 that are located on opposite sides of the main pole 31 in the track width direction (the X direction). Each of the portions 471 and 472 has: a front end face located in the medium facing surface 80; a side end face in contact with the main pole 31; a top surface; and a bottom surface in contact with the nonmagnetic layer 46. As shown in FIG. 6, parts of the two portions 471 and 472 of the nonmagnetic layer 47, the parts being apart from the medium facing surface 80, are located on opposite sides of the core 25 in the track width direction and are sufficiently spaced from the core 25 when viewed from above. The nonmagnetic layer 47 is made of, for example, alumina, $SiO_2$, SiC, or AlN.

The thermally-assisted magnetic recording head further includes a dielectric layer 32 disposed around the main pole 31 and the nonmagnetic layer 47. The fourth layers of the coupling portions 14A and 14B are embedded in the gap layer 27 and the dielectric layers 29 and 32. The top surfaces of the main pole 31, the nonmagnetic layer 47, the dielectric layer 32, and the fourth layers of the coupling portions 14A and 14B are even with each other. The dielectric layer 32 is made of $SiO_2$, for example.

The thermally-assisted magnetic recording head further includes a coil 38 disposed on the dielectric layer 32, an insulating layer 39 disposed to cover the coil 38, and a yoke layer 42 made of a magnetic material and disposed over the main pole 31, the coupling portions 14A and 14B, the dielectric layer 32 and the insulating layer 39. The yoke layer 42 magnetically couples the main pole 31 to the coupling portions 14A and 14B. The coil 38 is planar spiral-shaped and wound around part of the yoke layer 42 lying on the coupling portions 14A and 14B. The coil 38 is made of a conductive material such as copper. The insulating layer 39 is made of photoresist, for example.

The thermally-assisted magnetic recording head further includes a protective layer 44 disposed to cover the yoke layer 42. The protective layer 44 is made of alumina, for example.

The parts from the return pole layer 11 to the yoke layer 42 constitute a write head section. The coils 17 and 38 produce magnetic fields corresponding to data to be written on the recording medium. The coupling layers 21 and 13, the return pole layer 11, the coupling portions 14A and 14B, and the yoke layer 42 constitute a first return path section 81. The first return path section 81 connects the main pole 31 and the first shield 22 to each other so that a space is defined by the main pole 31, the first shield 22 and the first return path section 81 to allow portions of the coils 17 and 38 to pass through the space. The first return path section 81 allows magnetic fluxes corresponding to the magnetic fields produced by the coils 17 and 38 to pass.

The coils 17 and 38 are connected in series or in parallel so that the magnetic flux corresponding to the magnetic field produced by the coil 17 and the magnetic flux corresponding to the magnetic field produced by the coil 38 flow in the same direction through the main pole 31. The main pole 31 allows the magnetic flux corresponding to the magnetic field produced by the coil 17 and the magnetic flux corresponding to the magnetic field produced by the coil 38 to pass, and produces a write magnetic field for writing data on a recording medium by means of a perpendicular magnetic recording system.

As has been described, the thermally-assisted magnetic recording head according to the present embodiment includes the medium facing surface 80, the read head section, and the write head section. The medium facing surface 80 faces a recording medium. The read head section and the write head section are stacked on the substrate 1. Relative to the read head section, the write head section is located on the front side in the direction of travel of the recording medium (the Z direction) (i.e., located on the trailing side).

The read head section includes: the MR element 5 serving as the read element; the bottom shield layer 3 and the top shield layer 7 for shielding the MR element 5, the bottom shield layer 3 and the top shield layer 7 having their respective portions that are located near the medium facing surface 80 and are opposed to each other with the MR element 5 therebetween; the bottom shield gap film 4 disposed between the MR element 5 and the bottom shield layer 3; and the top shield gap film 6 disposed between the MR element 5 and the top shield layer 7.

The write head section includes the coils 17 and 38, the main pole 31, the waveguide, the plasmon generator 50, the first shield 22, and the first return path section 81. The waveguide includes the core 25 through which light propagates, and the cladding surrounding the core 25. In the present embodiment, in particular, the core 25 allows laser light emitted from a not-shown laser diode to propagate therethrough.

The core 25 has the top surface 25b. The plasmon generator 50 is disposed above the top surface 25b of the core 25. The main pole 31 is located on the front side in the direction of travel of the recording medium (the Z direction) relative to the plasmon generator 50. The first shield 22 is located on the rear side in the direction of travel of the recording medium (the Z direction) relative to the main pole 31 and the plasmon generator 50.

Figure 7:
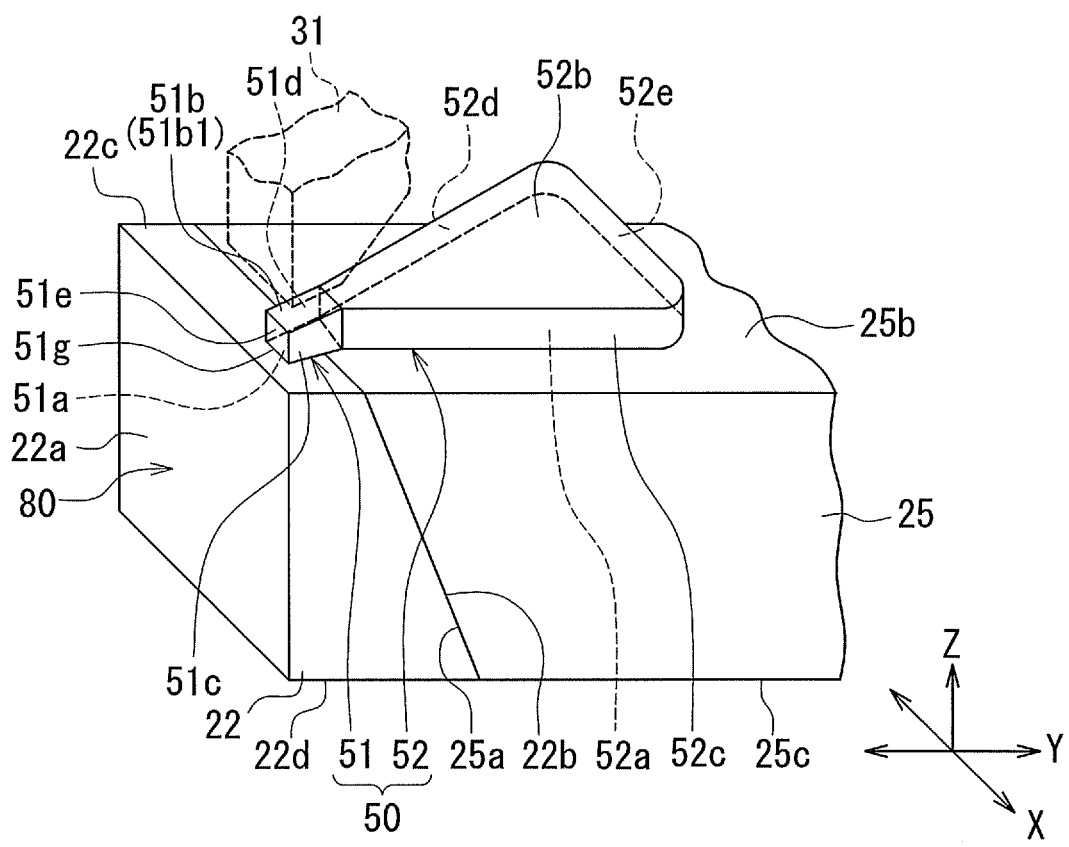
FIG. 7 is a perspective view showing the plasmon generator of the first embodiment of the invention.

Reference is now made to FIG. 1, FIG. 2, FIG. 5, and FIG. 7 to describe an example of the shape of the plasmon generator 50 in detail. FIG. 7 is a perspective view showing the plasmon generator 50. Note that FIG. 7 omits the illustration of the gap layer 27, the insulating film 28 and the nonmagnetic layer 46. As shown in FIG. 7, the plasmon generator 50 includes a propagation part 51 that is located near the medium facing surface 80, and a width changing portion 52 that is located farther from the medium facing surface 80 than is the propagation part 51.

The propagation part 51 has: a bottom surface 51a; a top surface 51b opposite to the bottom surface 51a; a first side surface 51c and a second side surface 51d opposite to each other and connecting the bottom surface 51a and the top surface 51b to each other; and a front end face 51e located in the medium facing surface 80 and connecting the bottom surface 51a, the top surface 51b, the first side surface 51c, and the second side surface 51d to each other.

The bottom surface 51a is parallel to the top surface 1a of the substrate 1, and is opposed to the top surface 22c of the first shield 22 with a predetermined spacing therebetween. Part of the bottom surface 51a may be opposed to the top surface 25b of the core 25. Part of the insulating film 28 is interposed between the first side surface 51c and the side end face of the portion 461, and between the second side surface 51d and the side end face of the portion 462. The front end face 51e includes a near-field light generating part 51g that lies at an end of the bottom surface 51a and generates near-field light based on surface plasmons.

The top surface 51b includes an inclined portion 51b1. The distance from the bottom surface 51a of the propagation part 51 to an arbitrary point on the inclined portion 51b1 decreases with decreasing distance from the arbitrary point to the front end face 51e. The top surface 51b may include a flat portion that is located closer to or farther from the medium facing surface 80 than is the inclined portion 51b1 and contiguous with the inclined portion 51b1. The flat portion is parallel to the bottom surface 51a.

For example, the propagation part 51 is rectangular in cross section parallel to the medium facing surface 80. The width of the propagation part 51 in a direction parallel to the medium facing surface 80 and the top surface 1a of the substrate 1 (the X direction) may be constant regardless of the distance from the medium facing surface 80 or may decrease with increasing proximity to the medium facing surface 80. The width (the dimension in the track width direction (the X direction)) of the front end face 51e is defined by the width of the propagation part 51 in the medium facing surface 80. The width of the front end face 51e falls within the range of 5 to 40 nm, for example. The height (the dimension in the Z direction) of the front end face 51e is defined by the height of the propagation part 51 in the medium facing surface 80. The height of the front end face 51e falls within the range of 5 to 40 nm, for example.

The width changing portion 52 is located on a side of the propagation part 51 farther from the front end face 51e and is connected to the propagation part 51. The width changing portion 52 has: a bottom surface 52a; a top surface 52b opposite to the bottom surface 52a; a first side surface 52c and a second side surface 52d opposite to each other and connecting the bottom surface 52a and the top surface 52b to each other; and a rear end face 52e connecting the bottom surface 52a, the top surface 52b, the first side surface 52c, and the second side surface 52d to each other.

The bottom surface 52a is located farther from the medium facing surface 80 than is the bottom surface 51a of the propagation part 51, and is contiguous with the bottom surface 51a. The top surface 52b is located farther from the medium facing surface 80 than is the top surface 51b of the propagation part 51, and is contiguous with the top surface 51b. The first side surface 52c is located farther from the medium facing surface 80 than is the first side surface 51c of the propagation part 51, and is contiguous with the first side surface 51c. The second side surface 52d is located farther from the medium facing surface 80 than is the second side surface 51d of the propagation part 51, and is contiguous with the second side surface 51d.

The bottom surface 52a is parallel to the top surface 1a of the substrate 1, and is opposed to the top surface 25b of the core 25 with a predetermined spacing therebetween. Part of the bottom surface 52a may be opposed to the top surface 22c of the first shield 22. Another part of the insulating film 28 is interposed between the first side surface 52c and the side end face of the portion 461, and between the second side surface 52d and the side end face of the portion 462.

For example, the width changing portion 52 is rectangular in cross section parallel to the medium facing surface 80. The width changing portion 52 has a width in a direction parallel to the bottom surface 51a and the front end face 51e of the propagation part 51 (the same direction as the direction parallel to the medium facing surface 80 and the top surface 1a of the substrate 1). The width of the width changing portion 52 decreases with increasing proximity to the front end face 51e, and becomes equal to the width of the propagation part 51 at the boundary with the propagation part 51. The width of the bottom surface 52a of the width changing portion 52 opposed to the top surface 25b of the core 25 decreases with increasing proximity to the medium facing surface 80, and becomes equal to the width of the bottom surface 51a of the propagation part 51 at the boundary with the bottom surface 51a.

An example of the shape of the main pole 31 will now be described with reference to FIG. 1, FIG. 2, FIG. 3, and FIG. 6. The main pole 31 has a first end face 31a located in the medium facing surface 80, a second end face 31b opposite to the first end face 31a, a bottom surface 31c, a top surface 31d, and two side surfaces 31e and 31f. The second end face 31b is inclined relative to the direction perpendicular to the top surface 1a of the substrate 1. A portion of the bottom surface 31c is opposed to the inclined portion 51b1 of the top surface 51b of the propagation part 51 with the nonmagnetic layer 30 interposed therebetween. The distance from the top surface 1a of the substrate 1 to an arbitrary point on each of the second end face 31b and the bottom surface 31c increases with increasing distance from the arbitrary point to the medium facing surface 80. The side surface 31e is in contact with the side end face of the portion 471 of the nonmagnetic layer 47. The side surface 31f is in contact with the side end face of the portion 472 of the nonmagnetic layer 47.

Note that the shapes of the plasmon generator 50 and the main pole 31 are not limited to the foregoing example described with reference to FIGS. 1, 2, 3, 5, 6, and 7.

The locations of the first shield 22, the core 25, the main pole 31, and the plasmon generator 50 relative to each other will now be described. In the medium facing surface 80, the first end face 22a of the first shield 22 is located on the rear side in the direction of travel of the recording medium relative to the first end face 31a of the main pole 31. The top surface 22c of the first shield 22 faces toward the main pole 31.

As shown in FIG. 1, the distance between the first end face 31a of the main pole 31 and the first end face 22a of the first shield 22 will be represented by the symbol D. The distance D is preferably in the range of 50 to 300 nm and more preferably in the range of 50 to 100 nm.

In the medium facing surface 80, the near-field light generating part 51g of the plasmon generator 50 is located between the first end face 31a of the main pole 31 and the first end face 22a of the first shield 22. At least part of the plasmon generator 50 is present between the top surface 22c of the first shield 22 and the main pole 31, whereas no part of the core 25 is present therebetween.

In the present embodiment, the plasmon generator 50 is greater than the top surface 22c of the first shield 22 in length in the direction perpendicular to the medium facing surface 80 (the Y direction), in particular. The plasmon generator 50 has a plasmon exciting part that faces the evanescent light generating surface (the top surface 25b) of the core 25 with a predetermined spacing therebetween. In the present embodiment, the plasmon exciting part is composed of portions of the bottom surface 51a of the propagation part 51 and the bottom surface 52a of the width changing portion 52 that are opposed to the evanescent light generating surface (the top surface 25b) of the core 25. The plasmon exciting part and the evanescent light generating surface (the top surface 25b) of the core 25 are located farther from the medium facing surface 80 than is the top surface 22c of the first shield 22.

Now, the principle of generation of near-field light in the present embodiment and the principle of thermally-assisted magnetic recording using the near-field light will be described in detail. Laser light emitted from a not-shown laser diode enters the core 25. As shown in FIG. 2, the laser light 60 propagates through the core 25 toward the medium facing surface 80, and reaches the vicinity of the plasmon generator 50. The plasmon generator 50 is configured to excite surface plasmons through coupling with evanescent light that occurs from the core 25 based on the light propagating through the core 25. More specifically, in the core 25, the laser light 60 is totally reflected at the evanescent light generating surface (the top surface 25b) to generate evanescent light permeating into the gap layer 27. Surface plasmons are then excited at least on the bottom surface 52a of the width changing portion 52 of the plasmon exciting part of the plasmon generator 50 through coupling with the evanescent light.

The surface plasmons excited on the bottom surface 52a of the width changing portion 52 propagate through the bottom surface 52a to reach the bottom surface 51a of the propagation part 51, and further propagate through the bottom surface 51a to reach the near-field light generating part 51g. Consequently, the surface plasmons concentrate at the near-field light generating part 51g, and the near-field light generating part 51g generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In thermally-assisted magnetic recording, the part of the magnetic recording layer with the lowered coercivity is subjected to a write magnetic field produced by the main pole 31 for data writing.

Now, with reference to FIG. 2 and FIG. 3, a description will be given of a method of manufacturing the thermally-assisted magnetic recording head according to the present embodiment. The method of manufacturing the thermally-assisted magnetic recording head according to the present embodiment includes the steps of: forming components of a plurality of thermally-assisted magnetic recording heads, except the substrates 1, on a substrate that includes portions to become the substrates 1 of the plurality of thermally-assisted magnetic recording heads, thereby fabricating a substructure including a plurality pre-head portions aligned in a plurality of rows, the plurality of pre-head portions being intended to become individual thermally-assisted magnetic recording heads later; and forming the plurality of thermally-assisted magnetic recording heads by cutting the substructure to separate the plurality of pre-head portions from each other. In the step of forming the plurality of thermally-assisted magnetic recording heads, the cut surfaces are polished into the medium facing surfaces 80.

The method of manufacturing the thermally-assisted magnetic recording head according to the present embodiment will now be described in more detail with attention focused on a single thermally-assisted magnetic recording head. The method of manufacturing the thermally-assisted magnetic recording head according to the present embodiment forms the insulating layer 2, the bottom shield layer 3, and the bottom shield gap film 4 in this order on the substrate 1 first. Next, the MR element 5 and not-shown two leads connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

Next, the return pole layer 11 is formed on the nonmagnetic layer 10. Then, the insulating layer 12 is formed to cover the return pole layer 11. The insulating layer 12 is then polished by, for example, chemical mechanical polishing (hereinafter referred to as CMP), until the return pole layer 11 is exposed. Next, the insulating layer 16 is formed over the return pole layer 11 and the insulating layer 12.

The insulating layer 16 is then selectively etched to form therein three openings for exposing the top surface of the return pole layer 11. In the positions of these three openings, the coupling layer 13 and the first layers of the coupling portions 14A and 14B are then formed on the return pole layer 11. Next, the coil 17 is formed on the insulating layer 16. The insulating layer 18 is then formed in the space between every adjacent turns of the coil 17. Next, the insulating layer 19 is formed over the entire top surface of the stack. The insulating layer 19 is then polished by, for example, CMP, until the coupling layer 13, the first layers of the coupling portions 14A and 14B, the coil 17, and the insulating layer 18 are exposed. Next, the insulating layer 20 is formed over the coupling layer 13, the first layers of the coupling portions 14A and 14B, the coil 17, and the insulating layers 18 and 19.

The insulating layer 20 is then selectively etched to form therein an opening for exposing the top surface of the coupling layer 13 and two openings for exposing the top surfaces of the first layers of the coupling portions 14A and 14B. Next, the coupling layer 21 is formed on the coupling layer 13, and the second layers of the coupling portions 14A and 14B are formed on the first layers of the coupling portions 14A and 14B. Next, the first cladding layer 24 is formed over the entire top surface of the stack. The first cladding layer 24 is then polished by, for example, CMP, until the coupling layer 21 and the second layers of the coupling portions 14A and 14B are exposed.

Next, the nonmagnetic layer 45 is formed over the entire top surface of the stack. Then, formed is a not-shown photoresist mask that has an opening shaped to correspond to the planar shape of the core 25. The photoresist mask is formed by patterning a photoresist layer by photolithography. Using the photoresist mask as an etching mask, the nonmagnetic layer 45 is then etched by, for example, reactive ion etching (hereinafter referred to as RIE) to form in the nonmagnetic layer 45 an accommodation part for the core 25 to be accommodated in. The photoresist mask is then removed. Next, the core 25 is formed in the accommodation part of the nonmagnetic layer 45.

Next, a not-shown photoresist mask whose planar shape corresponds to the planar shape of the two portions 451 and 452 of the nonmagnetic layer 45 is formed on the nonmagnetic layer 45, and another not-shown photoresist mask is formed on the core 25. Using the photoresist masks as etching masks, the nonmagnetic layer 45 is then etched by RIE, for example. This divides the nonmagnetic layer 45 into the two portions 451 and 452. The photoresist masks are then removed.

Next, the third layers of the coupling portions 14A and 14B are formed on the second layers of the coupling portions 14A and 14B, and the first shield 22 is formed on the coupling layer 21. Next, the second cladding layer is formed over the entire top surface of the stack. The second cladding layer is then polished by, for example, CMP, until the third layers of the coupling portions 14A and 14B, the first shield 22, the core 25 and the nonmagnetic layer 45 are exposed. Next, the gap layer 27 is formed over the entire top surface of the stack.

The insulating film 28, the dielectric layers 29 and 32, the nonmagnetic layers 30, 46, and 47, the main pole 31, and the plasmon generator 50 are then formed. This process will be described in detail later.

Next, the gap layer 27 and the dielectric layers 29 and 32 are selectively etched to form therein two openings for exposing the top surfaces of the third layers of the coupling portions 14A and 14B. The fourth layers of the coupling portions 14A and 14B are then formed on the third layers of the coupling portions 14A and 14B.

Next, the coil 38 is formed on the dielectric layer 32. The insulating layer 39 is then formed to cover the coil 38. Next, the yoke layer 42 is formed over the main pole 31, the fourth layers of the coupling portions 14A and 14B, the dielectric layer 32, and the insulating layer 39. Next, the protective layer 44 is formed to cover the yoke layer 42. Wiring, terminals, and other components are then formed on the top surface of the protective layer 44.

When the substructure is completed thus, the substructure is cut to separate the plurality of pre-head portions from each other, followed by the polishing of the medium facing surface 80 and the fabrication of flying rails etc. This completes the thermally-assisted magnetic recording head.

Reference is now made to FIG. 8 to FIG. 14 to describe the process for forming the insulating film 28, the dielectric layers 29 and 32, the nonmagnetic layers 30, 46, and 47, the main pole 31, and the plasmon generator 50 in detail. FIG. 8 to FIG. 14 are cross-sectional views each showing a stack of layers formed in the process of manufacturing the thermally-assisted magnetic recording head. FIG. 8 to FIG. 14 each show a cross section of the stack taken in the position where the medium facing surface 80 is to be formed.

Figure 8:
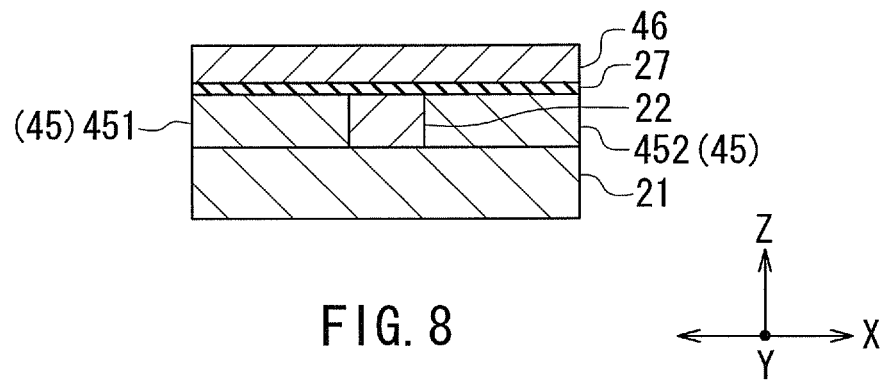
FIG. 8 is a cross-sectional view showing a step of a method of manufacturing the thermally-assisted magnetic recording head according to the first embodiment of the invention.

FIG. 8 shows a step that follows the formation of the gap layer 27. In this step, the nonmagnetic layer 46 is formed on the gap layer 27.

Figure 9:
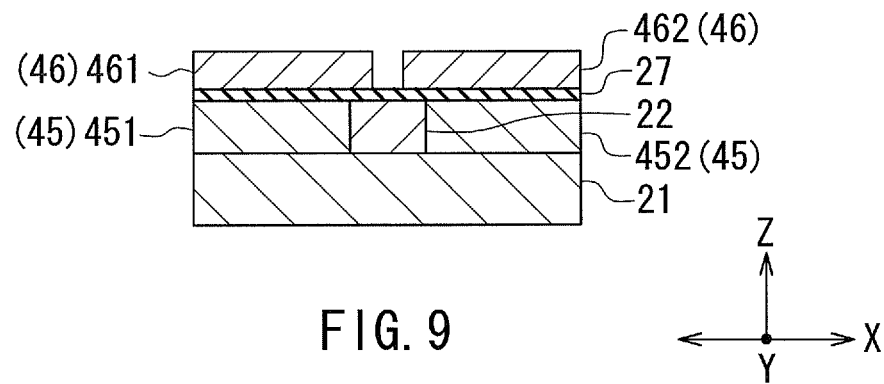
FIG. 9 is a cross-sectional view showing a step that follows the step shown in FIG. 8.

FIG. 9 shows the next step. In this step, first, a not-shown photoresist mask is formed on the nonmagnetic layer 46. The planar shape of the photoresist mask corresponds to the planar shape of the two portions 461 and 462 of the nonmagnetic layer 46. Using the photoresist mask as an etching mask, the nonmagnetic layer 46 is then etched by RIE, for example. This divides the nonmagnetic layer 46 into the two portions 461 and 462. Then, the photoresist mask is removed.

Figure 10:
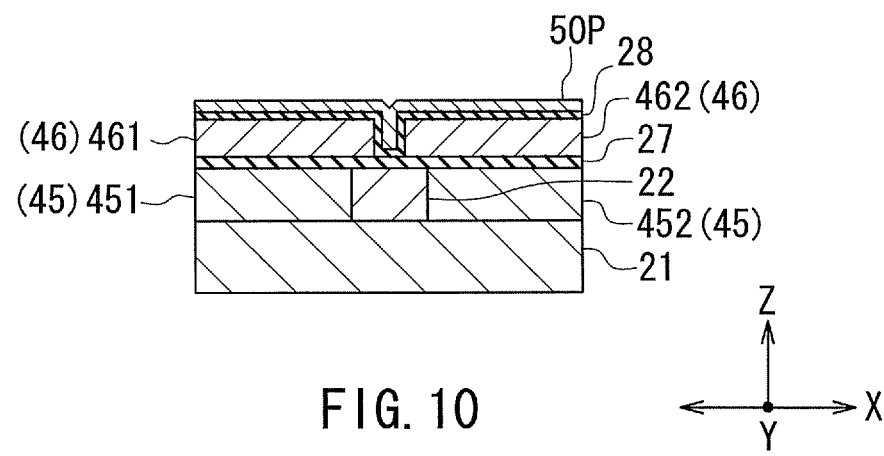
FIG. 10 is a cross-sectional view showing a step that follows the step shown in FIG. 9.

FIG. 10 shows the next step. In this step, first, a not-shown photoresist mask is formed on the stack shown in FIG. 9. The photoresist mask has an opening in the vicinity of the position where the medium facing surface 80 is to be formed. Next, the insulating film 28 is formed over the entire top surface of the stack. A metal film 50P, which is to become the plasmon generator 50 later, is then formed over the entire top surface of the stack by sputtering, for example. The photoresist mask is then removed.

Figure 11:
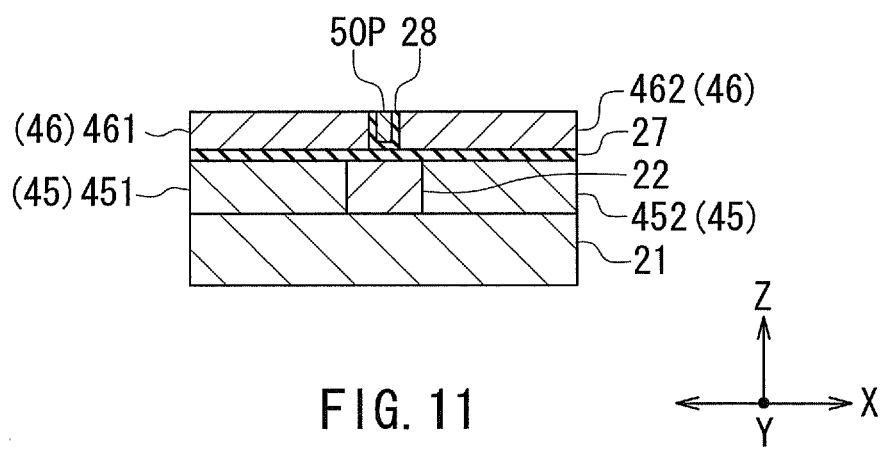
FIG. 11 is a cross-sectional view showing a step that follows the step shown in FIG. 10.

FIG. 11 shows the next step. In this step, first, the dielectric layer 29 is formed over the entire top surface of the stack. Note that the dielectric layer 29 does not appear in FIG. 11. The insulating film 28, the dielectric layer 29, and the metal film 50P are then polished by, for example, CMP, until the top surfaces of the two portions 461 and 462 are exposed.

Figure 12:
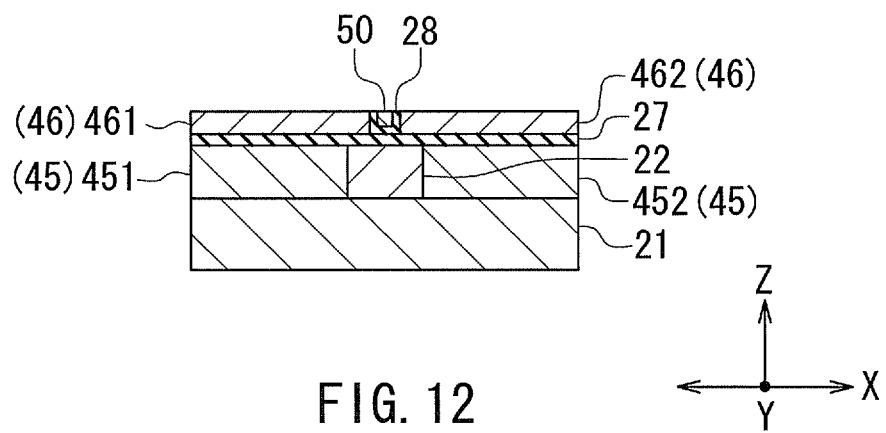
FIG. 12 is a cross-sectional view showing a step that follows the step shown in FIG. 11.

FIG. 12 shows the next step. In this step, respective portions of the insulating film 28, the dielectric layer 29, the nonmagnetic layer 46, and the metal film 50P are removed by etching so that the top surface of the polished metal film 50P has the inclined portion 51b1. This etching is performed in the following manner, for example. First, a photoresist mask is formed to cover at least a portion of the top surface of the polished metal film 50P, the portion being intended to later become the top surface 52b of the width changing portion 52. Then, using the photoresist mask as an etching mask, the respective portions of the insulating film 28, the dielectric layer 29, the nonmagnetic layer 46, and the metal film 50P are taper-etched by, for example, ion beam etching (hereinafter referred to as IBE), in the areas not covered by the photoresist mask. The inclined portion 51b1 is thereby formed. The photoresist mask is then removed. This makes the metal film 50P into the plasmon generator 50.

Figure 13:
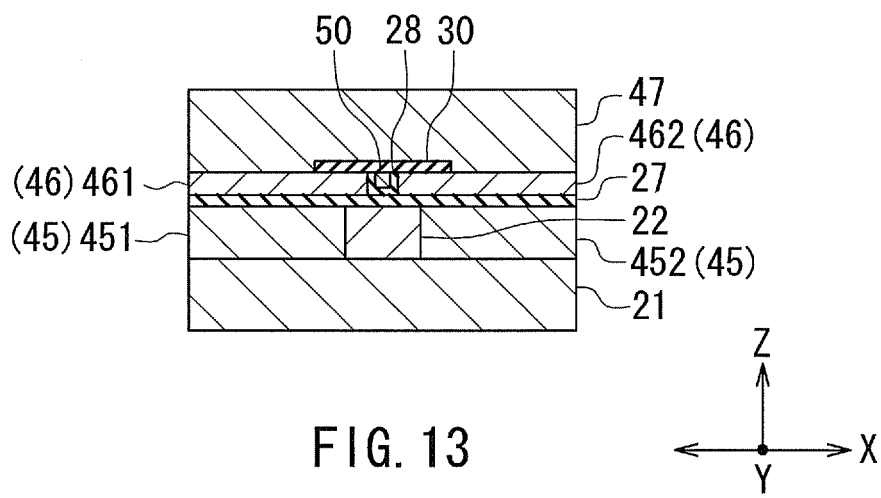
FIG. 13 is a cross-sectional view showing a step that follows the step shown in FIG. 12.

FIG. 13 shows the next step. In this step, first, the nonmagnetic layer 30 is formed to cover the plasmon generator 50. Then, the nonmagnetic layer 47 is formed over the entire top surface of the stack.

Figure 14:
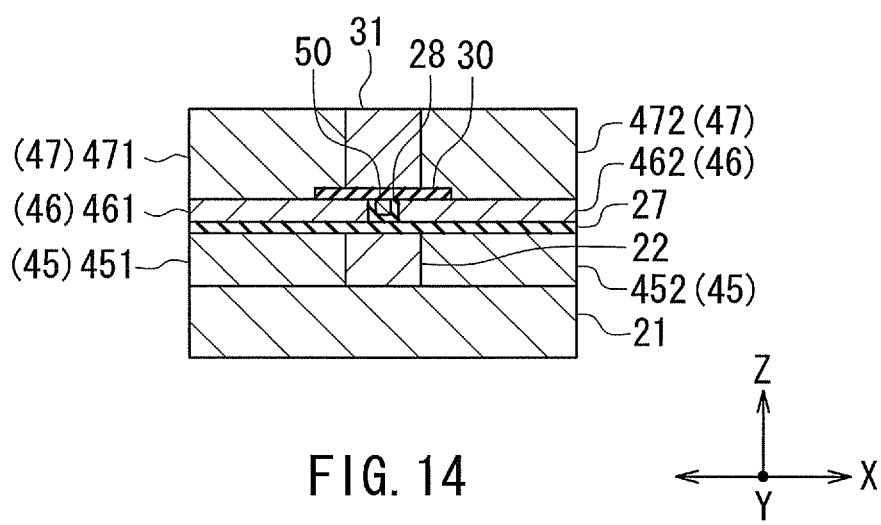
FIG. 14 is a cross-sectional view showing a step that follows the step shown in FIG. 13.

FIG. 14 shows the next step. In this step, first, a not-shown photoresist mask is formed on the nonmagnetic layer 47. The planar shape of the photoresist mask corresponds to the planar shape of the two portions 471 and 472 of the nonmagnetic layer 47. Using the photoresist mask as an etching mask, the nonmagnetic layer 47 is then etched by RIE, for example. This divides the nonmagnetic layer 47 into the two portions 471 and 472. Then, the photoresist mask is removed.

Next, the dielectric layer 32 is formed over the entire top surface of the stack. The dielectric layer 32 is then polished by, for example, CMP, until the top surface of the nonmagnetic layer 47 is exposed. Next, a not-shown photoresist mask is formed over the dielectric layer 32 and the nonmagnetic layer 47. The photoresist mask has an opening shaped to correspond to the planar shape of the main pole 31 to be formed later. Then, using the photoresist mask as an etching mask, a portion of the dielectric layer 32 that is exposed from the opening of the photoresist mask is taper-etched by, for example, RIE or IBE, to form in the dielectric layer 32 an accommodation part for the main pole 31 to be accommodated in. The photoresist mask is then removed. Next, the main pole 31 is formed in the accommodation part of the dielectric layer 32.

The operation and effects of the thermally-assisted magnetic recording head according to the present embodiment will now be described. The thermally-assisted magnetic recording head according to the present embodiment includes the first shield 22 and the first return path section 81. The first shield 22 is located on the rear side in the direction of travel of the recording medium relative to the main pole 31. The first return path section 81 connects the main pole 31 and the first shield 22 to each other. The first shield 22 has the first end face 22a and the top surface 22c. In the medium facing surface 80, the first end face 22a is located on the rear side in the direction of travel of the recording medium relative to the first end face 31a of the main pole 31. The top surface 22c faces toward the main pole 31.

The first shield 22 captures a disturbance magnetic field applied to the thermally-assisted magnetic recording head from the outside thereof. This makes it possible to prevent erroneous writing on a recording medium induced by the disturbance magnetic field intensively captured into the main pole 31. The first shield 22 also functions to capture a magnetic flux that is produced from the end face 31a of the main pole 31 and spreads in directions other than the direction perpendicular to the plane of the recording medium, and to thereby prevent the magnetic flux from reaching the recording medium. It is thereby possible to increase the write field intensity gradient. Furthermore, the first shield 22 and the first return path section 81 function to allow a magnetic flux that has been produced from the end face 31a of the main pole 31 and has magnetized the recording medium to flow back to the main pole 31.

Now, a head of a comparative example will be contemplated. The head of the comparative example is configured so that the core and the plasmon generator are interposed between a shield and the main pole, as disclosed in U.S. Patent Application Publication No. 2011/0058272 A1. In the head of the comparative example, the distance between the end face of the main pole and the end face of the shield in the medium facing surface is greater, by at least the thickness of the core, than the distance D between the first end face 31a of the main pole 31 and the first end face 22a of the first shield 22 in the present embodiment. Accordingly, in the head of the comparative example, the shield cannot exert its function satisfactorily and it is therefore difficult to increase the write field intensity gradient to increase the linear recording density.

In contrast, the present embodiment is configured so that at least part of the plasmon generator 50 is present between the top surface 22c of the first shield 22 and the main pole 31 whereas no part of the core 25 is present therebetween. The present embodiment thus allows the end face 31a of the main pole 31 and the end face 22a of the first shield 22 to be located closer to each other easily, compared with the head of the comparative example. More specifically, according to the present embodiment, it is possible to bring the end face 31a of the main pole 31 and the end face 22a of the first shield 22 into close proximity to each other easily so that the distance D falls within the range of 50 to 300 nm. Consequently, the above-described functions of shield 22 can be effectively exerted to increase the write field intensity gradient. The lower limit of the distance D (50 nm) is a distance necessary to dispose the near-field light generating part 51g between the end face 31a of the main pole 31 and the end face 22a of the first shield 22. To increase the write field intensity gradient, the distance D should be as small as possible. In view of the foregoing, the distance D is preferably in the range of 50 to 300 nm and more preferably in the range of 50 to 100 nm.

In the present embodiment, the near-field light generating part 51g of the plasmon generator 50 is located in the medium facing surface 80 and lies between the end face 31a of the main pole 31 and the end face 22a of the first shield 22. This makes it possible to produce a write magnetic field of a large write field intensity gradient in the vicinity of the near-field light generating part 51g. According to the present embodiment, it is thereby possible to increase the linear recording density.

In the present embodiment, the first shield 22 made of a magnetic metal material is disposed on the leading side of the plasmon generator 50, particularly in the vicinity of the near-field light generating part 51g. Since the top surface 22c of the first shield 22 is located close to the bottom surface 51a of the propagation part 51 of the plasmon generator 50, surface plasmons are excited also on the top surface 22c. Then, the electric line of force produced by the surface plasmons on the bottom surface 51a of the propagation part 51 and the electric line of force produced by the surface plasmons on the top surface 22c of the first shield 22 are coupled to each other in the vicinity of the near-field light generating part 51g. This produces a high-density electric line of force in a narrow area in the vicinity of the near-field light generating part 51g. The spread of the near-field light generated by the near-field light generating part 51g is thereby suppressed. Thus, the first shield 22 of the present embodiment also has the function of suppressing the spread of near-field light. According to the present embodiment, this function of the first shield 22 allows a reduction in track width, thereby allowing an increase in recording density.

The other effects provided by the present embodiment will now be described. In the present embodiment, the plasmon generator 50 has the propagation part 51 and the width changing portion 52. The width of the bottom surface 52a of the width changing portion 52 facing the top surface 25b of the core 25 decreases with increasing proximity to the medium facing surface 80, and becomes equal to the width of the bottom surface 51a at the boundary with the bottom surface 51a. The present embodiment allows a larger area of the bottom surface of the plasmon generator 50 to be opposed to the top surface 25b of the core 25 to allow more surface plasmons to be excited than in the case where the width changing portion 52 is not provided. Consequently, according to the present embodiment, it is possible to generate near-field light of sufficient intensity.

As the plasmon generator 50 is reduced in thickness (dimension in the Z direction), the excitation efficiency of surface plasmons is decreased to cause less surface plasmons to be excited. For this reason, the thickness of the plasmon generator 50 is preferably increased to some extent. In the present embodiment, the top surface 51b of the propagation part 51 includes the inclined portion 51b1. The distance from the bottom surface 51a of the propagation part 51 to an arbitrary point on the inclined portion 51b1 decreases with decreasing distance from the arbitrary point to the front end face 51e. According to the present embodiment, it is thereby possible to reduce the dimension of the front end face 51e in the Z direction while increasing the thickness of a portion of the plasmon generator 50 that is apart from the medium facing surface 80. Consequently, according to the present embodiment, it is possible to produce near-field light having a small spot diameter and sufficient intensity.

Part of the energy of the light propagating through the core 25 is transformed into heat in the plasmon generator 50. This causes a rise in temperature of the plasmon generator 50. The rise in temperature of the plasmon generator 50 increases the temperatures of the main pole 31 and the first shield 22 located in the vicinity of the plasmon generator 50. This results in expansion of the first shield 22, the plasmon generator 50 and the main pole 31, so that part of the medium facing surface 80 protrudes toward the recording medium. This causes an end of the read head section located in the medium facing surface 80 to get farther from the recording medium, thereby causing the problem that a servo signal cannot be read during write operation. In addition, the rise in temperature of each of the first shield 22, the plasmon generator 50 and the main pole 31 may cause corrosion of these components, and the rise in temperature of the main pole 31 may degrade the magnetic properties of the main pole 31 to cause deterioration of the characteristics of the write head section.

To address this problem, SiC or AlN, which has a high thermal conductivity, may be used as the materials of the nonmagnetic layers 45, 46, and 47 disposed in the vicinity of the first shield 22, the plasmon generator 50, and the main pole 31. This makes it possible to enhance the heat dissipation performance of the first shield 22, the plasmon generator 50 and the main pole 31 to thereby suppress a rise in temperature thereof. At 25° C., alumina has a thermal conductivity of approximately 30 W/m·K; $SiO_2$ has a thermal conductivity of approximately 1 W/m·K; SiC has a thermal conductivity of approximately 75 W/m·K; and AlN has a thermal conductivity of approximately 170 W/m·K.

In the present embodiment, the nonmagnetic layer 30 disposed between the plasmon generator 50 and the main pole 31 may be formed of a material having a low thermal conductivity such as $SiO_2$. This makes it possible to suppress direct heat transfer from the plasmon generator 50 to the main pole 31, thereby allowing the main pole 31 to be protected from the heat generated by the plasmon generator 50.

Second Embodiment

Figure 15:
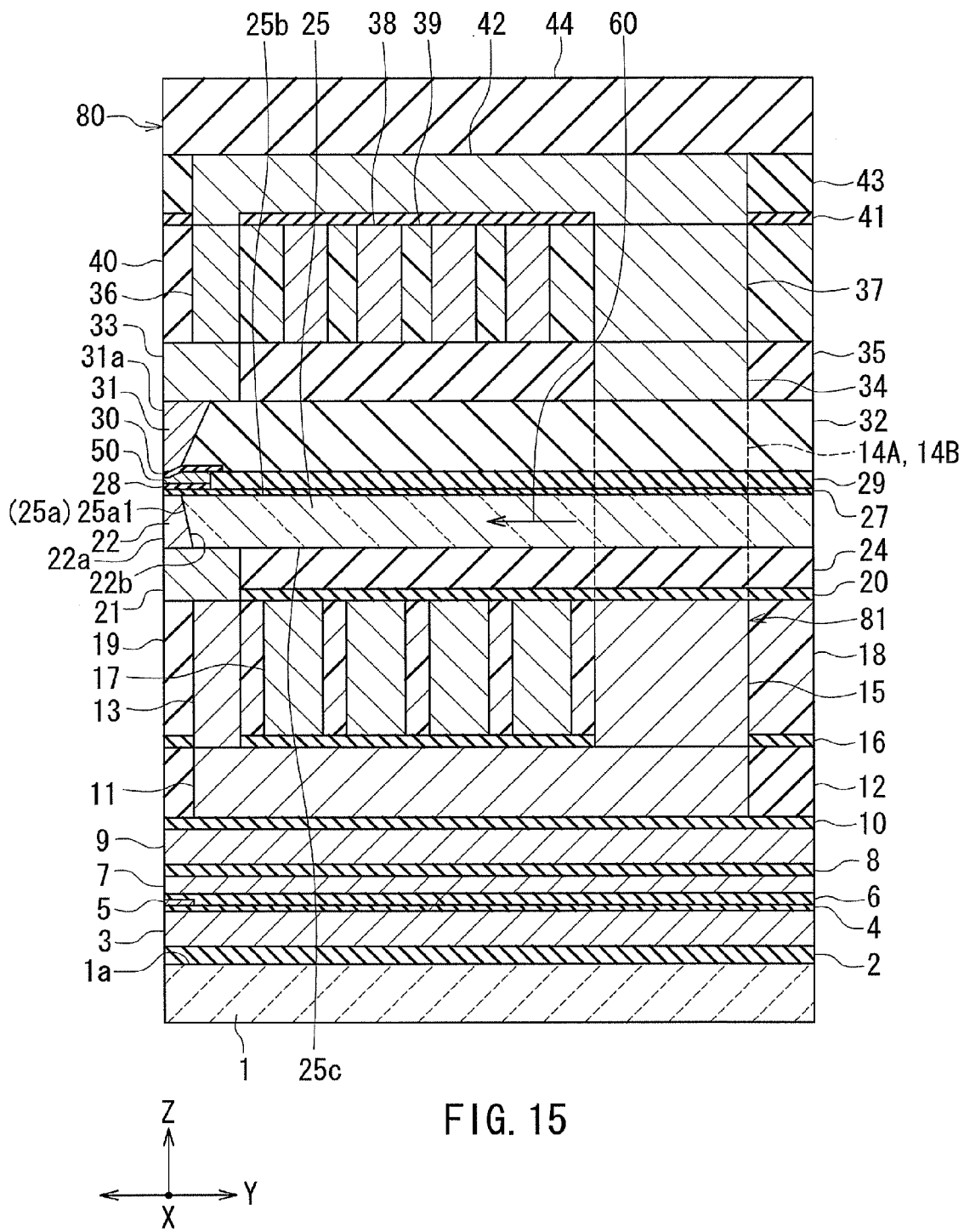
FIG. 15 is a cross-sectional view showing the configuration of a thermally-assisted magnetic recording head according to a second embodiment of the invention.
Figure 16:
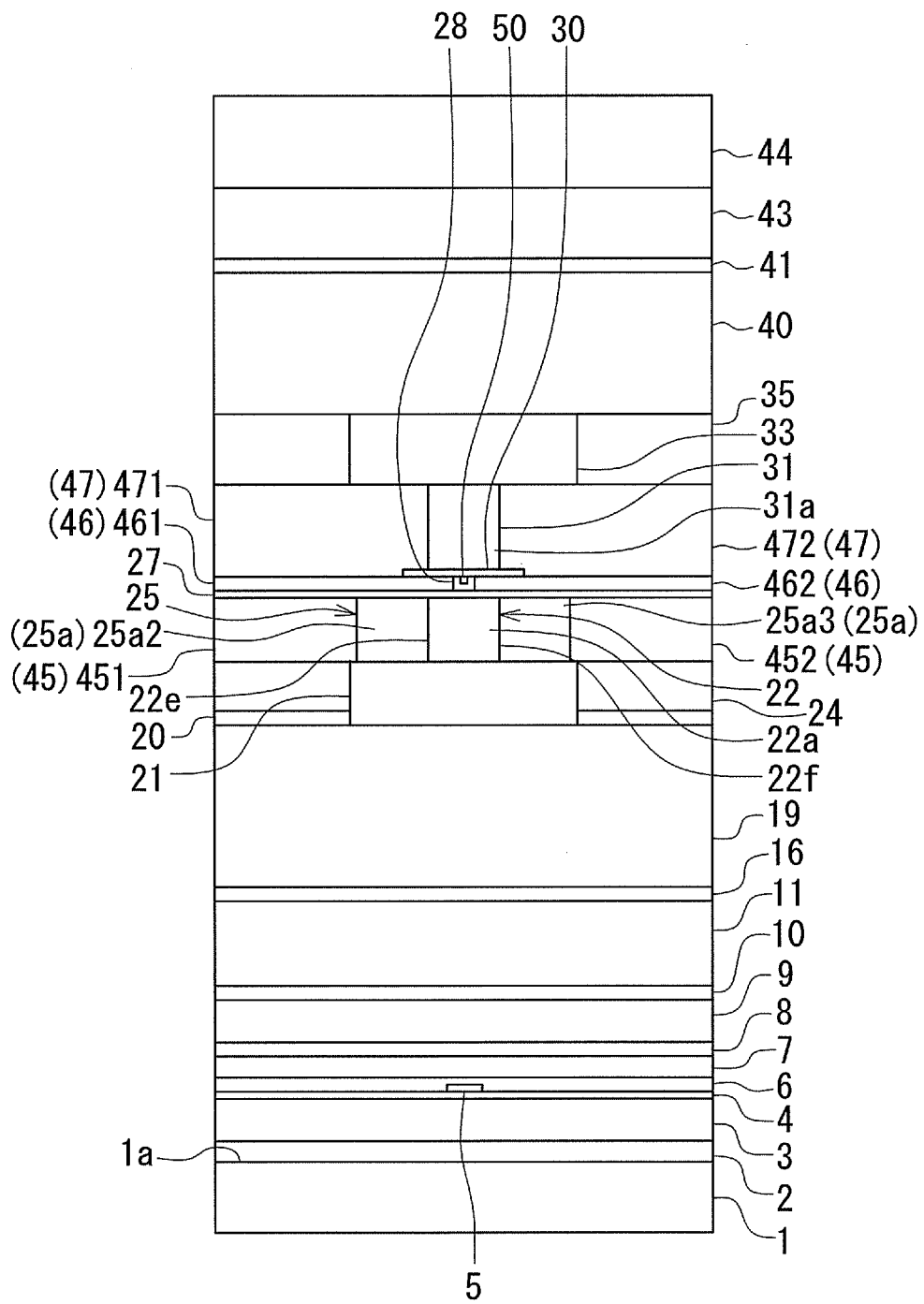
FIG. 16 is a front view showing the medium facing surface of the thermally-assisted magnetic recording head according to the second embodiment of the invention.

A thermally-assisted magnetic recording head according to a second embodiment of the invention will now be described. First, reference is made to FIG. 15 and FIG. 16 to describe the differences of the thermally-assisted magnetic recording head according to the present embodiment from the thermally-assisted magnetic recording head according to the first embodiment. FIG. 15 is a cross-sectional view showing the configuration of the thermally-assisted magnetic recording head. FIG. 16 is a front view showing the medium facing surface of the thermally-assisted magnetic recording head. The thermally-assisted magnetic recording head according to the present embodiment includes a coupling layer 15 made of a magnetic material, instead of the first layers of the coupling portions 14A and 14B of the first embodiment. In the present embodiment, the coil 17 is wound around the coupling layer 15. The second layers of the coupling portions 14A and 14B are located on the coupling layer 15.

In the present embodiment, each of the return pole layer 11 and the coupling layer 13 has an end face located at a distance from the medium facing surface 80. A portion of the insulating layer 12 is interposed between the end face of the return pole layer 11 and the medium facing surface 80. Portions of the insulating layers 16 and 19 are interposed between the end face of the coupling layer 13 and the medium facing surface 80. In the present embodiment, the insulating layer 18 is disposed around the coil 17 and the coupling layers 13 and 15 and in the space between every adjacent turns of the coil 17.

In the present embodiment, the end face 25a of the core 25 includes: a first portion 25a1 in contact with the second end face 22b of the first shield 22; and a second portion 25a2 and a third portion 25a3 that are located in the medium facing surface 80 at positions on opposite sides of the first end face 22a of the first shield 22 in the track width direction. Part of the core 25 is interposed between the nonmagnetic layer 45 and each of the two side surfaces 22e and 22f of the first shield 22.

The thermally-assisted magnetic recording head further includes: a coupling layer 33 made of a magnetic material and disposed on the main pole 31; a coupling layer 34 made of a magnetic material and disposed over the fourth layers of the coupling portions 14A and 14B and the dielectric layer 32; and a dielectric layer 35 disposed around the coupling layers 33 and 34. The dielectric layer 35 is made of $SiO_2$, for example. The coupling layer 33 has an end face located in the medium facing surface 80.

The thermally-assisted magnetic recording head further includes a coupling layer 36 made of a magnetic material and disposed on the coupling layer 33, and a coupling layer 37 made of a magnetic material and disposed on the coupling layer 34. In the present embodiment, the coil 38 is disposed on the dielectric layer 35 and wound around the coupling layer 37. The insulating layer 39 is disposed around the coil 38 and the coupling layers 36 and 37 and in the space between every adjacent turns of the coil 38.

The thermally-assisted magnetic recording head further includes an insulating layer 40 disposed around the coupling layer 36 and the insulating layer 39, and an insulating layer 41 disposed over the coil 38 and the insulating layers 39 and 40. In the present embodiment, the yoke layer 42 is disposed over the coupling layers 36 and 37 and the insulating layer 41. The yoke layer 42 magnetically couples the coupling layer 36 and the coupling layer 37 to each other. The thermally-assisted magnetic recording head further includes an insulating layer 43 disposed around the yoke layer 42. The insulating layers 40, 41, and 43 are made of alumina, for example. In the present embodiment, the protective layer 44 is disposed to cover the yoke layer 42 and the insulating layer 43.

In the present embodiment, the first return path section 81 is constituted of the coupling layers 21 and 13, the return pole layer 11, the coupling layer 15, the coupling portions 14A and 14B, the coupling layers 34 and 37, the yoke layer 42, and the coupling layers 36 and 33.

A method of manufacturing the thermally-assisted magnetic recording head according to the present embodiment will now be described with reference to FIG. 17A to FIG. 20B. FIG. 17A to FIG. 20B are cross-sectional views each showing part of a stack of layers formed in the process of manufacturing the thermally-assisted magnetic recording head. FIG. 17A to FIG. 20A each show a cross section that intersects the end face 31a of the main pole 31 and is perpendicular to the medium facing surface 80 and the top surface 1a of the substrate 1. FIG. 17B to FIG. 20B each show a cross section of the stack taken in the position where the medium facing surface 80 is to be formed.

Figure 17A:
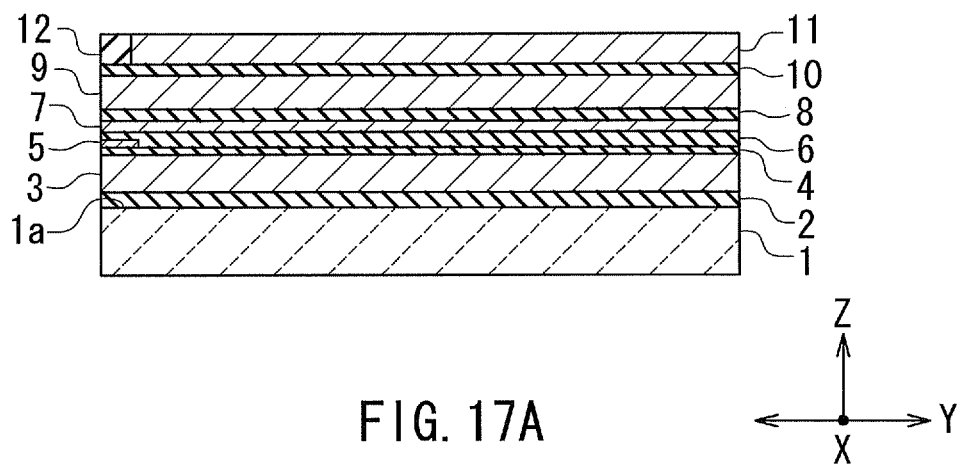
FIG. 17A and FIG. 17B are cross-sectional views showing a step of a method of manufacturing the thermally-assisted magnetic recording head according to the second embodiment of the invention.
Figure 17B:
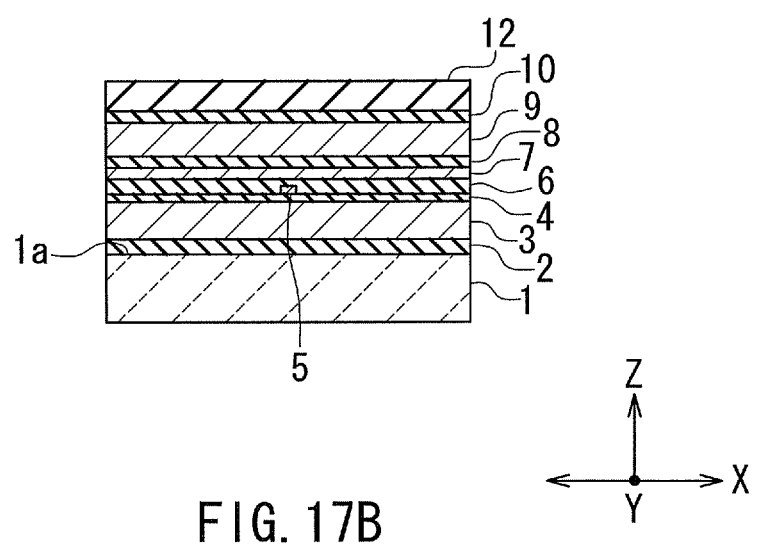

The method of manufacturing the thermally-assisted magnetic recording head according to the present embodiment is the same as that of first embodiment up to the step of polishing the insulating layer 12. FIG. 17A and FIG. 17B show the stack having undergone the polishing of the insulating layer 12.

Figure 18A:
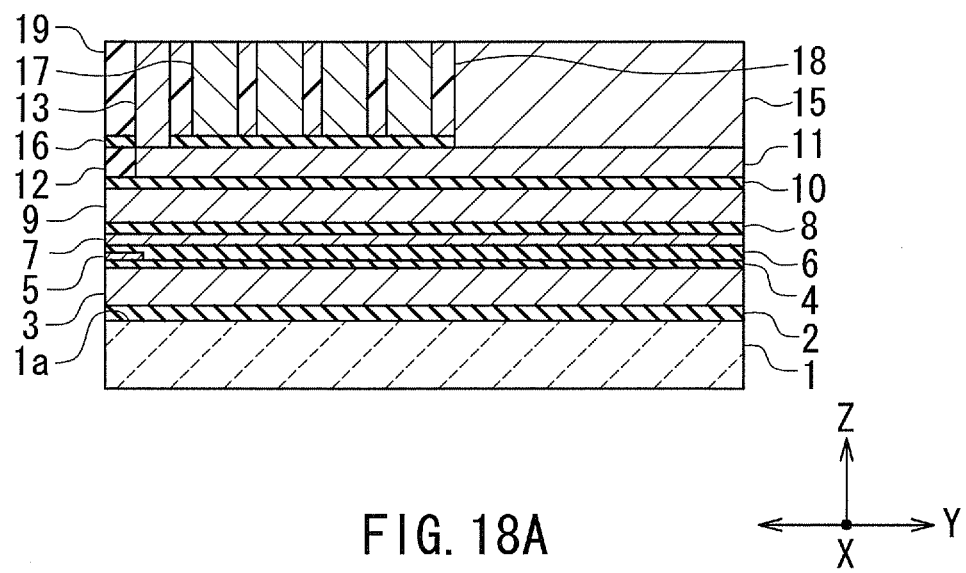
FIG. 18A and FIG. 18B are cross-sectional views showing a step that follows the step shown in FIG. 17A and FIG. 17B.
Figure 18B:
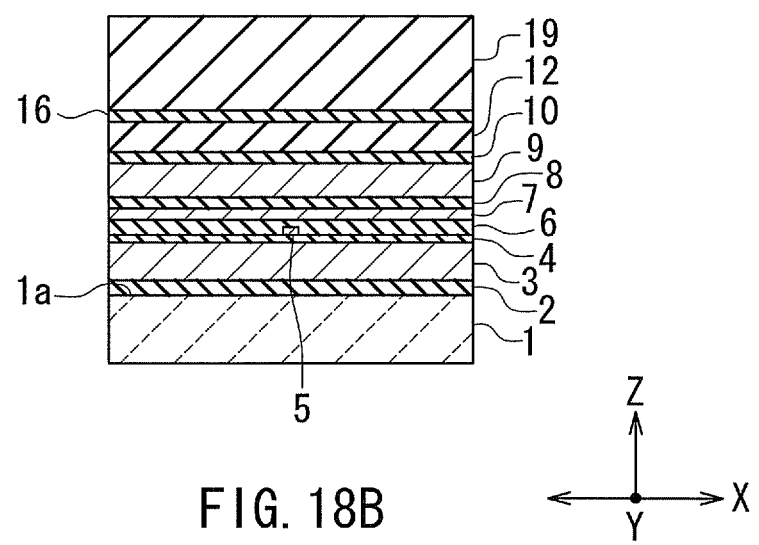

FIG. 18A and FIG. 18B show the next step. In this step, first, the insulating layer 16 is formed over the return pole layer 11 and the insulating layer 12. The insulating layer 16 is then selectively etched to form therein two openings for exposing the top surface of the return pole layer 11. In the positions of these two openings, the coupling layers 13 and 15 are then formed on the return pole layer 11. Next, the coil 17 is formed on the insulating layer 16. The insulating layer 18 is then formed around the coil 17 and the coupling layers 13 and 15 and in the space between every adjacent turns of the coil 17. Next, the insulating layer 19 is formed over the entire top surface of the stack. The insulating layer 19 is then polished by, for example, CMP, until the coupling layers 13 and 15, the coil 17, and the insulating layer 18 are exposed.

Figure 19A:
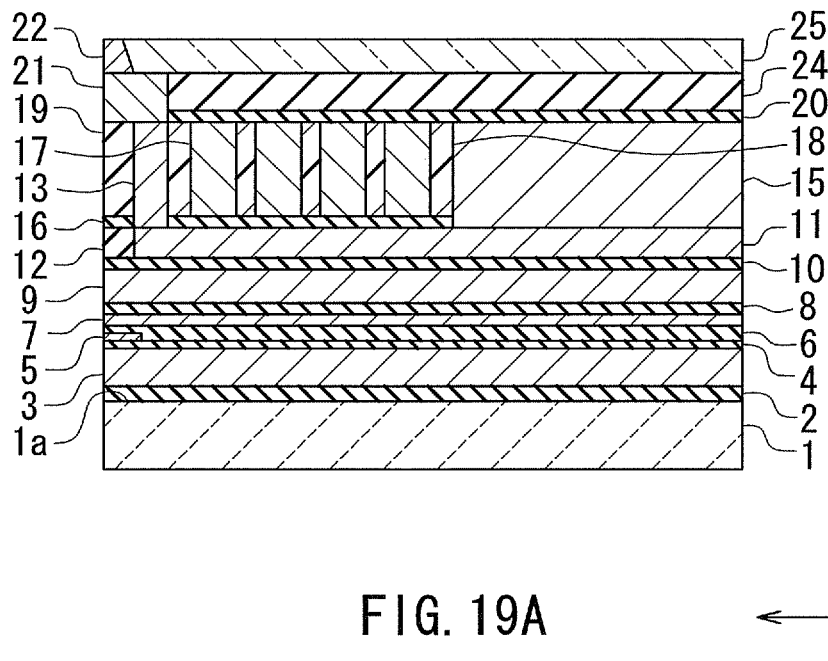
FIG. 19A and FIG. 19B are cross-sectional views showing a step that follows the step shown in FIG. 18A and FIG. 18B.
Figure 19B:
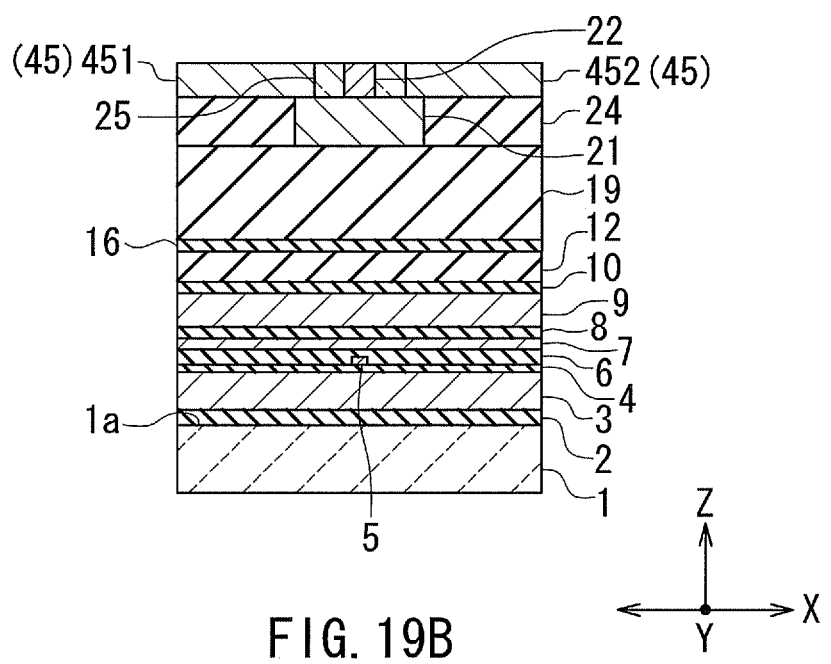

FIG. 19A and FIG. 19B show the next step. In this step, first, the insulating layer 20 is formed over the entire top surface of the stack. The insulating layer 20 is then selectively etched to form therein an opening for exposing the top surface of the coupling layer 13 and two openings for exposing the top surface of the coupling layer 15. Then, the coupling layer 21 is formed over the coupling layer 13 and the insulating layer 19, and the second layers of the coupling portions 14A and 14B are formed on the coupling layer 15. Next, the first cladding layer 24 is formed over the entire top surface of the stack. The first cladding layer 24 is then polished by, for example, CMP, until the second layers of the coupling portions 14A and 14B and the coupling layer 21 are exposed.

Next, the nonmagnetic layer 45 is formed over the entire top surface of the stack. A not-shown photoresist mask is then formed. The photoresist mask has an opening shaped to correspond to the planar shape of the core 25. Using the photoresist mask as an etching mask, the nonmagnetic layer 45 is then etched by, for example, RIE, to form in the nonmagnetic layer 45 an accommodation part for the core 25 to be accommodated in. The photoresist mask is then removed. Next, the core 25 is formed in the accommodation part of the nonmagnetic layer 45.

Next, a not-shown photoresist mask is formed on the top surface of the stack. The planar shape of the photoresist mask corresponds to the planar shape of the core 25 and the two portions 451 and 452 of the nonmagnetic layer 45. Using the photoresist mask as an etching mask, the nonmagnetic layer 45 is then etched by RIE, for example. This divides the nonmagnetic layer 45 into the two portions 451 and 452. The photoresist mask is then removed.

A not-shown photoresist mask is then formed on the top surface of the stack. The photoresist mask has an opening shaped to correspond to the planar shape of the first shield 22 to be formed later. Using the photoresist mask as an etching mask, the core 25 is then etched by, for example, RIE, to form therein an accommodation part for the first shield 22 to be accommodated in. The photoresist mask is then removed.

Next, the third layers of the coupling portions 14A and 14B are formed on the second layers of the coupling portions 14A and 14B, and the first shield 22 is formed in the accommodation part of the core 25. Then, the second cladding layer (not shown) is formed over the entire top surface of the stack. The second cladding layer is then polished by, for example, CMP, until the third layers of the coupling portions 14A and 14B, the first shield 22, the core 25, and the nonmagnetic layer 45 are exposed.

Figure 20A:
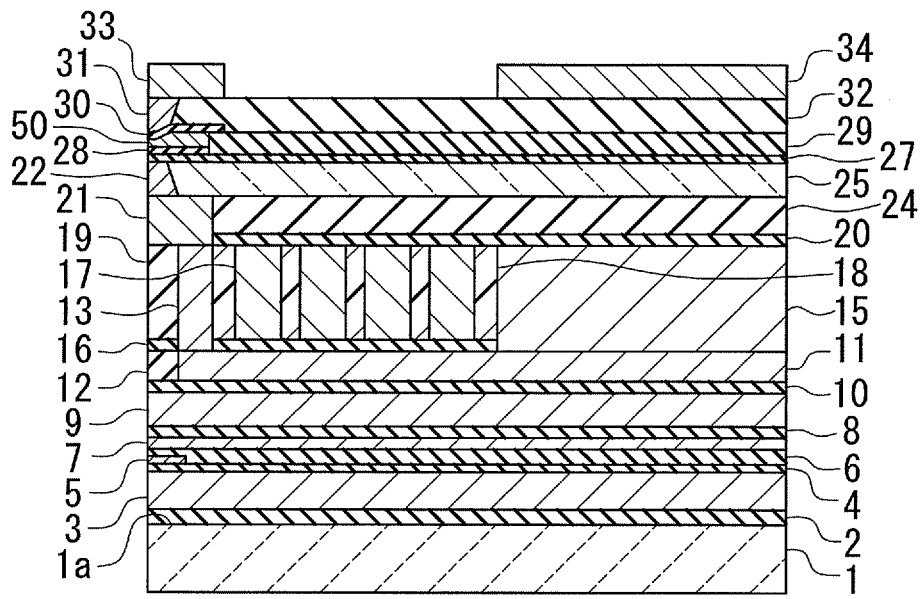
FIG. 20A and FIG. 20B are cross-sectional views showing a step that follows the step shown in FIG. 19A and FIG. 19B.
Figure 20A:
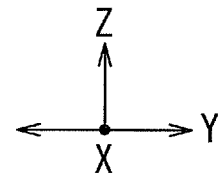
Figure 20B:
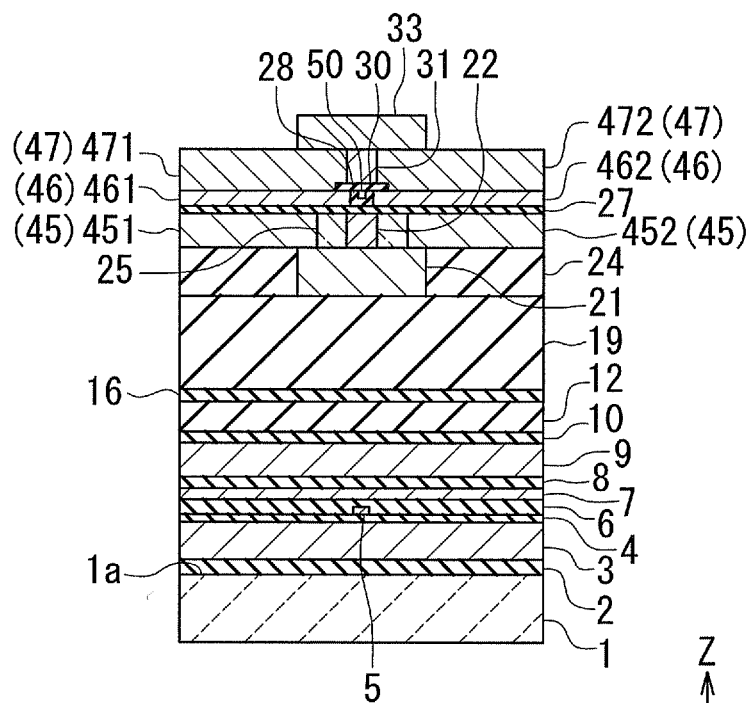
Figure 20B:
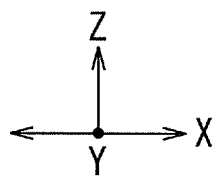

FIG. 20A and FIG. 20B show the next step. In this step, first, the gap layer 27 is formed over the entire top surface of the stack. The insulating film 28, the dielectric layers 29 and 32, the nonmagnetic layers 30, 46, and 47, the main pole 31, and the plasmon generator 50 are then formed in the same manner as the process that has been described with reference to FIG. 8 to FIG. 14 in relation to the first embodiment. Next, the gap layer 27 and the dielectric layers 29 and 32 are selectively etched to form therein two openings for exposing the top surfaces of the third layers of the coupling portions 14A and 14B. The fourth layers of the coupling portions 14A and 14B are then formed on the third layers of the coupling portions 14A and 14B. Next, the coupling layer 33 is formed over the main pole 31 and the dielectric layer 32, and the coupling layer 34 is formed over the fourth layers of the coupling portions 14A and 14B and the dielectric layer 32.

The steps to follow the step shown in FIG. 20A and FIG. 20B will now be described with reference to FIG. 15 and FIG. 16. First, the dielectric layer 35 is formed over the entire top surface of the stack. The dielectric layer 35 is then polished by, for example, CMP, until the coupling layers 33 and 34 are exposed.

Next, the coupling layer 36 is formed on the coupling layer 33, and the coupling layer 37 is formed on the coupling layer 34. Further, the coil 38 is formed on the dielectric layer 35. The insulating layer 39 is then formed around the coil 38 and the coupling layers 36 and 37 and in the space between every adjacent turns of the coil 38. Next, the insulating layer 40 is formed over the entire top surface of the stack. The insulating layer 40 is then polished by, for example, CMP, until the coupling layers 36 and 37, the coil 38, and the insulating layer 39 are exposed.

Next, the insulating layer 41 is formed over the entire top surface of the stack. The insulating layer 41 is then selectively etched to form therein an opening for exposing the top surface of the coupling layer 36 and an opening for exposing the top surface of the coupling layer 37. Next, the yoke layer 42 is formed over the coupling layers 36 and 37 and the insulating layer 41. Then, the insulating layer 43 is formed over the entire top surface of the stack. The insulating layer 43 is then polished by, for example, CMP, until the yoke layer 42 is exposed. The protective layer 44 is then formed to cover the yoke layer 42 and the insulating layer 43. The subsequent steps are the same as in the first embodiment.

The remainder of configuration, function and effects of the present embodiment are similar to those of the first embodiment.

Third Embodiment

Figure 21:
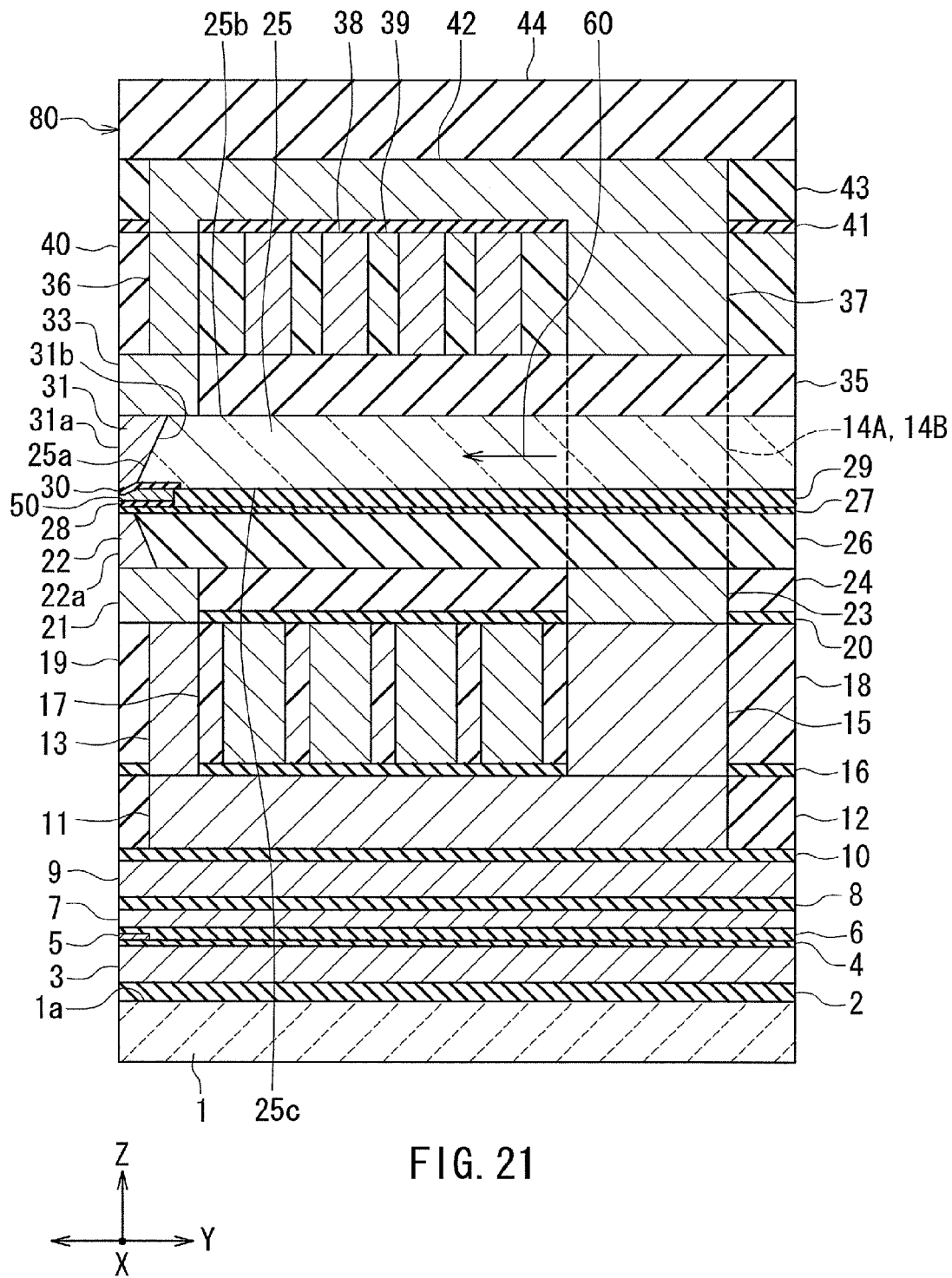
FIG. 21 is a cross-sectional view showing the configuration of a thermally-assisted magnetic recording head according to a third embodiment of the invention.

A thermally-assisted magnetic recording head according to a third embodiment of the invention will now be described. First, reference is made to FIG. 21 to describe the differences of the thermally-assisted magnetic recording head according to the present embodiment from the thermally-assisted magnetic recording head according to the second embodiment. FIG. 21 is a cross-sectional view showing the configuration of the thermally-assisted magnetic recording head. In the thermally-assisted magnetic recording head according to the present embodiment, the core 25 is disposed at a different position from that in the second embodiment. In the present embodiment, the core 25 is disposed at such a position that the main pole 31 is interposed between the core 25 and the medium facing surface 80. More specifically, the core 25 is disposed on the dielectric layer 29 and the nonmagnetic layer 30. The end face 25a of the core 25 is in contact with the second end face 31b of the main pole 31.

Part of the nonmagnetic layer 30 is interposed between the bottom surface 25c of the core 25 and the top surface of the plasmon generator 50. Parts of the two portions 471 and 472 of the nonmagnetic layer 47, the parts being apart from the medium facing surface 80 (see FIG. 6), are located on opposite sides of the core 25 in the track width direction (the X direction) and are spaced from the core 25. The dielectric layer 32 (see FIG. 15) is disposed around the core 25, the main pole 31, and the nonmagnetic layer 47. The dielectric layer 35 is disposed over the core 25, the dielectric layer 32, and the nonmagnetic layer 47.

The thermally-assisted magnetic recording head according to the present embodiment includes a coupling layer 23 instead of the second layers of the coupling portions 14A and 14B. The coupling layer 23 is located on the coupling layer 15. The third layers of the coupling portions 14A and 14B are located on the coupling layer 23. The insulating layer 20 and the first cladding layer 24 surround the coupling layer 23.

The thermally-assisted magnetic recording head according to the present embodiment does not have the coupling layer 34. Instead, the coupling portions 14A and 14B have their respective fifth layers on their respective fourth layers. The fifth layers of the coupling portions 14A and 14B are embedded in the dielectric layer 35. The coupling layer 37 is disposed over the fifth layers of the coupling portions 14A and 14B and the dielectric layer 35. In the present embodiment, the first return path section 81 is constituted of the coupling layers 21 and 13, the return pole layer 11, the coupling layers 15 and 23, the coupling portions 14A and 14B, the coupling layer 37, the yoke layer 42, and the coupling layers 36 and 33.

In the present embodiment, the dielectric layers 29, 32, and 35, and the nonmagnetic layer 30 function as the cladding of the waveguide. The dielectric layers 29, 32, and 35 and the nonmagnetic layer 30 of the present embodiment are each made of a dielectric material that has a refractive index lower than that of the core 25. Examples of materials of the dielectric layers 29, 32, and 35 and the nonmagnetic layer 30 include $SiO_2$ and alumina.

The principle of generation of near-field light in the present embodiment will now be described. In the present embodiment, the bottom surface 25c of the core 25 corresponds to the evanescent light generating surface according to the invention. The plasmon exciting part of the plasmon generator 50 is composed of portions of the top surface 51b of the propagation part 51 and the top surface 52b of the width changing portion 52 that are opposed to the evanescent light generating surface (the bottom surface 25c) of the core 25. As has been described in relation to the first embodiment, laser light emitted from a not-shown laser diode enters the core 25. As shown in FIG. 21, the laser light 60 propagates through the core 25 toward the medium facing surface 80, and reaches the vicinity of the plasmon generator 50. Here, the laser light 60 is totally reflected at the evanescent light generating surface (the bottom surface 25c) of the core 25 to generate evanescent light permeating into the nonmagnetic layer 30. Surface plasmons are then excited on the plasmon exciting part of the plasmon generator 50 through coupling with the evanescent light.

The remainder of configuration, function and effects of the present embodiment are similar to those of the second embodiment.

Fourth Embodiment

Figure 22:
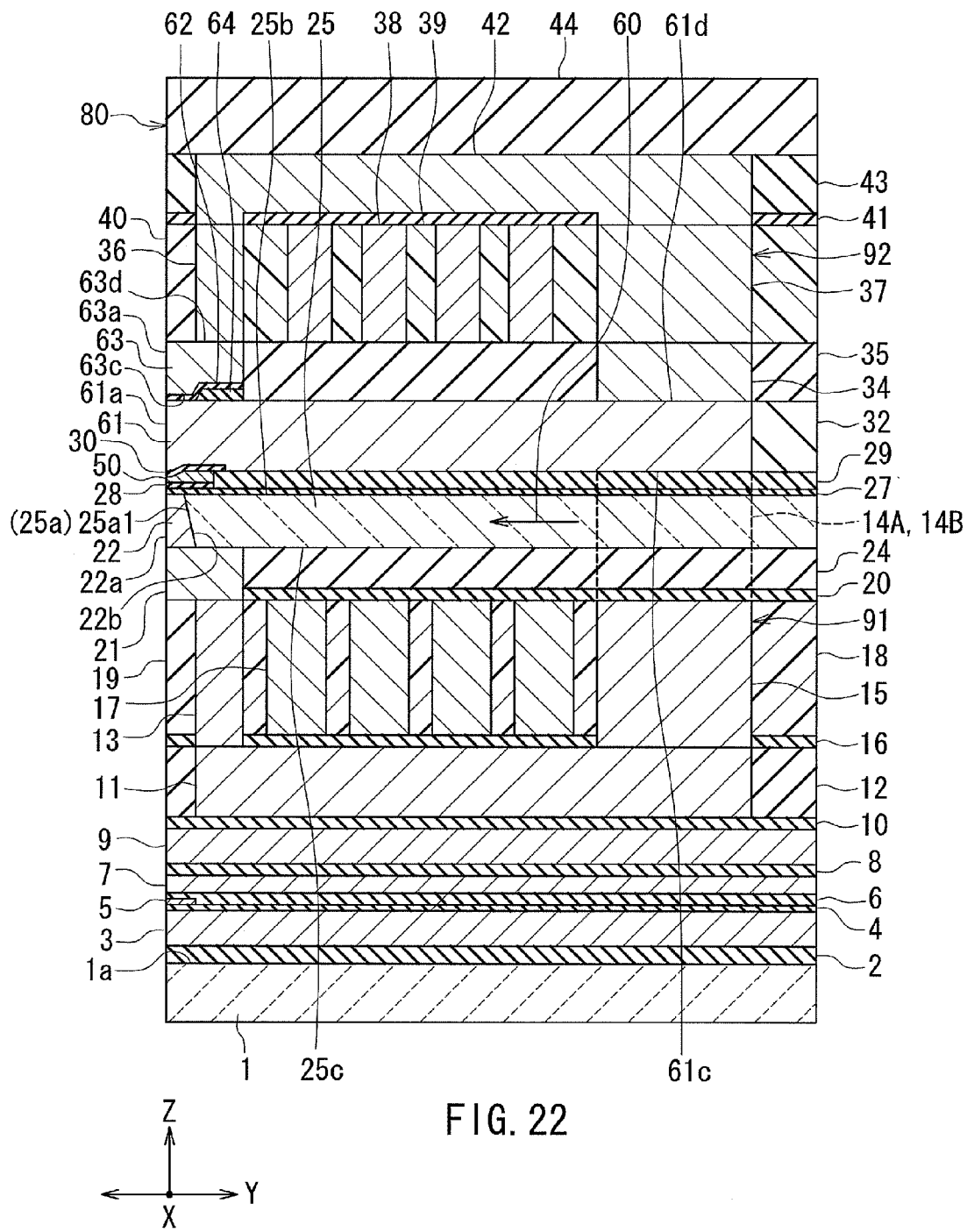
FIG. 22 is a cross-sectional view showing the configuration of a thermally-assisted magnetic recording head according to a fourth embodiment of the invention.
Figure 23:
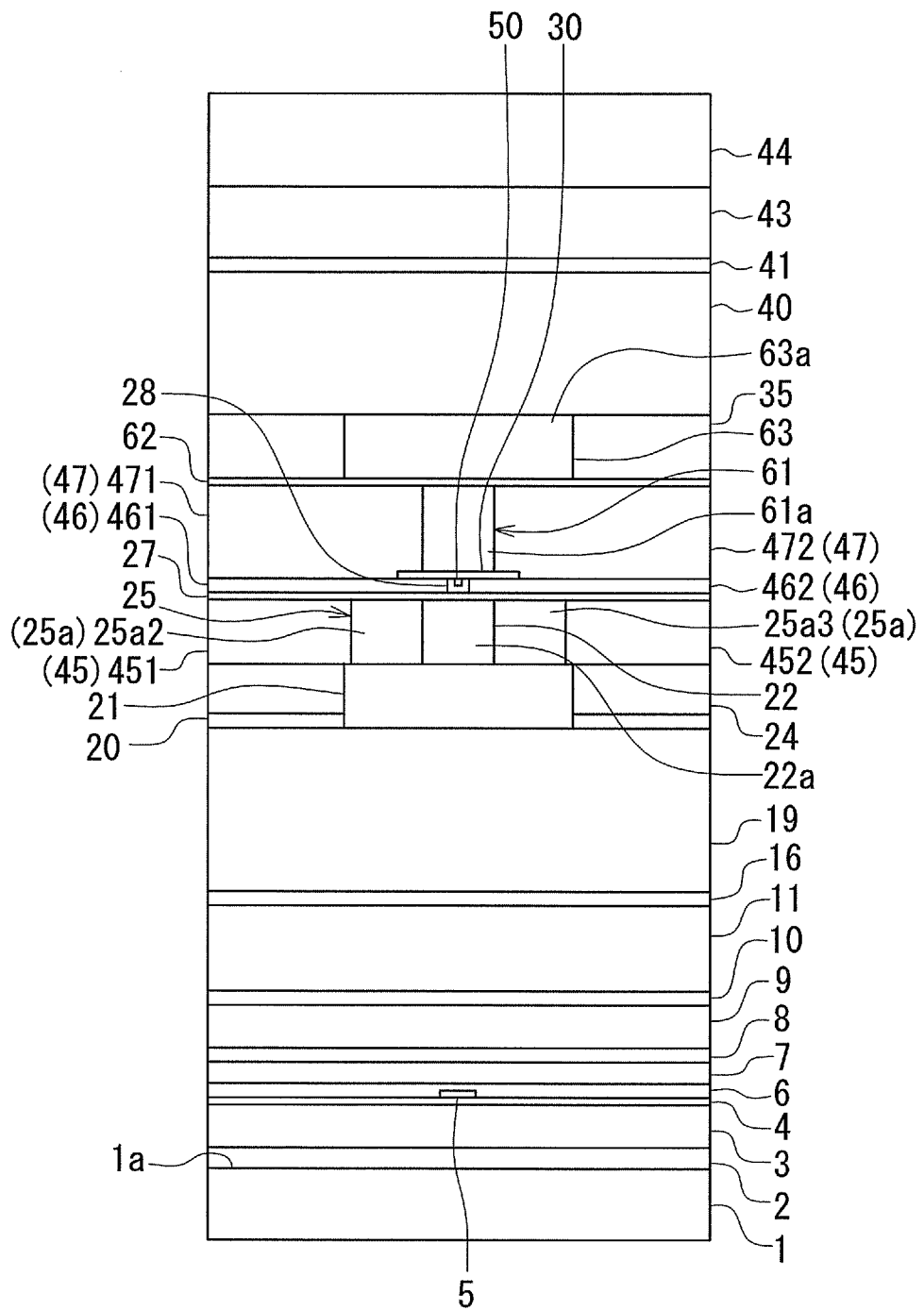
FIG. 23 is a front view showing the medium facing surface of the thermally-assisted magnetic recording head according to the fourth embodiment of the invention.

A thermally-assisted magnetic recording head according to a fourth embodiment of the invention will now be described. First, reference is made to FIG. 22 and FIG. 23 to describe the differences of the thermally-assisted magnetic recording head according to the present embodiment from the thermally-assisted magnetic recording head according to the second embodiment. FIG. 22 is a cross-sectional view showing the configuration of the thermally-assisted magnetic recording head. FIG. 23 is a front view showing the medium facing surface of the thermally-assisted magnetic recording head. The thermally-assisted magnetic recording head according to the present embodiment has a main pole 61 and a second shield 63 each made of a magnetic material, instead of the main pole 31 and the coupling layer 33 of the second embodiment, respectively. Furthermore, in the present embodiment, the fourth layers of the coupling portions 14A and 14B are embedded in the gap layer 27 and the dielectric layer 29, and not in the dielectric layer 32.

The main pole 61 is disposed on the dielectric layer 29 and the nonmagnetic layer 30. The main pole 61 has an end face 61a located in the medium facing surface 80, a bottom surface 61c, and a top surface 61d. In the vicinity of the medium facing surface 80, the bottom surface 61c faces the top surface of the plasmon generator 50 with the nonmagnetic layer 30 interposed therebetween. At a position away from the medium facing surface 80, the bottom surface 61c is in contact with the top surfaces of the fourth layers of the coupling portions 14A and 14B. At a position away from the medium facing surface 80, the top surface 61d is in contact with the bottom surface of the coupling layer 34.

The second shield 63 is located on the front side in the direction of travel of the recording medium (the Z direction) relative to the main pole 61. The second shield 63 has an end face 63a, a bottom surface 63c, and a top surface 63d. The end face 63a is located in the medium facing surface 80 and lies on the front side in the direction of travel of the recording medium relative to the end face 61a of the main pole 61. The top surface 63d is in contact with the bottom surface of the coupling layer 36.

The thermally-assisted magnetic recording head according to the present embodiment has a gap layer 62 interposed between the main pole 61 and the second shield 63, and an insulating layer 64 disposed on a part of the top surface 61d of the main pole 61 at a position away from the medium facing surface 80. The gap layer 62 is disposed to cover the main pole 61 and the insulating layer 64. Therefore, at a position away from the medium facing surface 80, the distance between the top surface 61d of the main pole 61 and the bottom surface 63c of the second shield 63 is greater than the distance between the end face 61a of the main pole 61 and the end face 63a of the second shield 63. The gap layer 62 is made of a nonmagnetic material. The material of the gap layer 62 may be a nonmagnetic insulating material such as alumina, or a nonmagnetic conductive material such as Ru, NiCu, Ta, W, NiB, or NiP. The insulating layer 64 is made of alumina, for example.

The coupling layers 21 and 13, the return pole layer 11, the coupling layer 15, and the coupling portions 14A and 14B constitute a first return path section 91. The first return path section 91 connects the main pole 61 and the first shield 22 to each other so that a first space is defined by the main pole 61, the first shield 22 and the first return path section 91 to allow a part of the coil 17 to pass through the first space. The first return path section 91 allows a magnetic flux corresponding to the magnetic field produced by the coil 17 to pass.

The coupling layer 36, the yoke layer 42, and the coupling layers 37 and 34 constitute a second return path section 92. The second return path section 92 connects the main pole 61 and the second shield 63 to each other so that a second space is defined by the main pole 61, the second shield 63 and the second return path section 92 to allow a part of the coil 38 to pass through the second space. The second return path section 92 allows a magnetic flux corresponding to the magnetic field produced by the coil 38 to pass.

The present embodiment is configured so that in the medium facing surface 80, the first end face 22a of the first shield 22 is located on the rear side in the direction of travel of the recording medium relative to the end face 61a of the main pole 61 whereas the end face 63a of the second shield 63 is located on the front side in the direction of travel of the recording medium relative to the end face 61a. The present embodiment thus makes it possible that, in regions on opposite sides of the end face 61a of the main pole 61 in the direction in which the tracks extend, a magnetic flux that is produced from the end face 61a and spreads in directions other than the direction perpendicular to the plane of the recording medium can be captured and thereby prevented from reaching the recording medium. Consequently, according to the present embodiment, it is possible to increase the write field intensity gradient on both sides of the peak position of the write field intensity in the direction in which the tracks extend. This makes it possible to further increase the linear recording density.

The remainder of configuration, function and effects of the present embodiment are similar to those of the second embodiment.

Fifth Embodiment

Figure 24:
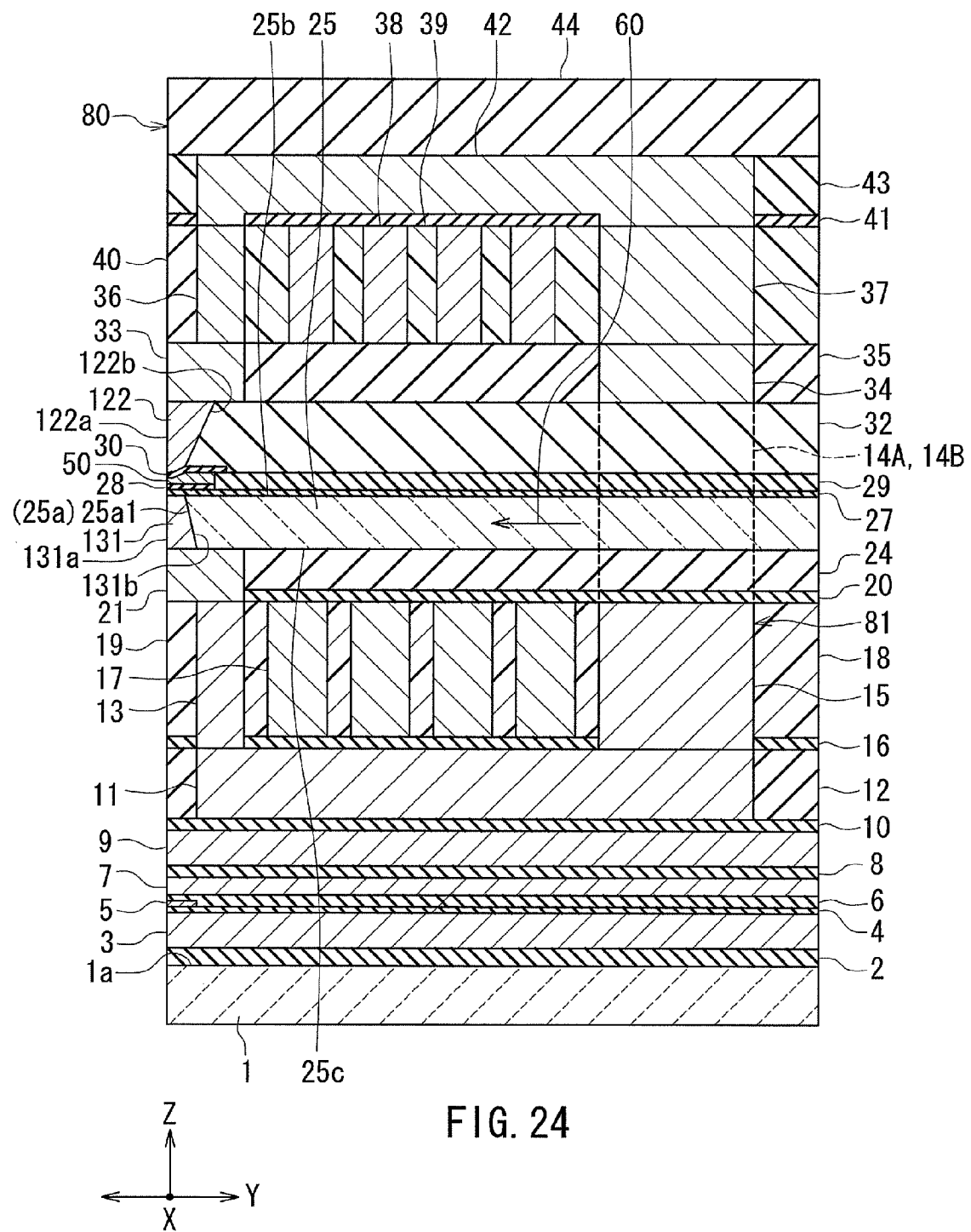
FIG. 24 is a cross-sectional view showing the configuration of a thermally-assisted magnetic recording head according to a fifth embodiment of the invention.
Figure 25:
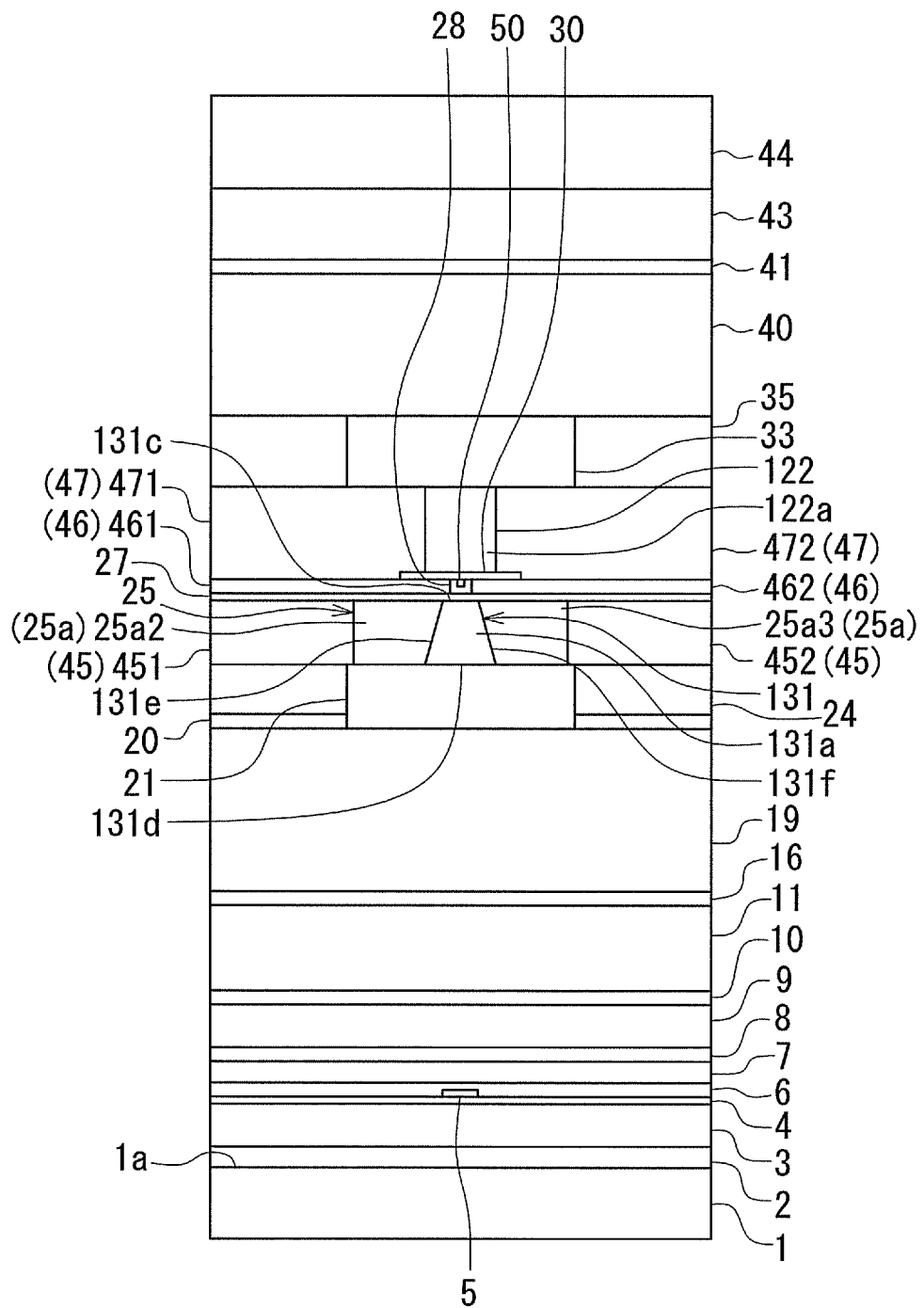
FIG. 25 is a front view showing the medium facing surface of the thermally-assisted magnetic recording head according to the fifth embodiment of the invention.

A thermally-assisted magnetic recording head according to a fifth embodiment of the invention will now be described with reference to FIG. 24 and FIG. 25. FIG. 24 is a cross-sectional view showing the configuration of the thermally-assisted magnetic recording head according to the present embodiment. FIG. 25 is a front view showing the medium facing surface of the thermally-assisted magnetic recording head according to the present embodiment. Now, a description will be given of the differences of the thermally-assisted magnetic recording head according to the present embodiment from the thermally-assisted magnetic recording head according to the second embodiment.

The thermally-assisted magnetic recording head according to the present embodiment has a main pole 131 made of a magnetic material instead of the first shield 22 of the second embodiment, and a shield 122 instead of the main pole 31 of the second embodiment.

The main pole 131 is disposed on the coupling layer 21. The main pole 131 has a first end face 131a located in the medium facing surface 80, a second end face 131b opposite to the first end face 131a, a top surface 131c, a bottom surface 131d, and two side surfaces 131e and 131f. The second end face 131b is inclined relative to the direction perpendicular to the top surface 1a of the substrate 1. The distance from the medium facing surface 80 to an arbitrary point on the second end face 131b decreases with increasing distance from the arbitrary point to the top surface 1a of the substrate 1.

In the present embodiment, the core 25 is disposed at such a position that the main pole 131 is interposed between the core 25 and the medium facing surface 80. The end face 25a of the core 25 is in contact with the second end face 131b of the main pole 131.

As shown in FIG. 25, the first end face 131a has a trapezoidal shape, for example. In this case, the distance between the two side surfaces 131e and 131f in the track width direction (the X direction) decreases with increasing proximity to the top surface 131c.

The shield 122 has a first end face 122a located in the medium facing surface 80, a second end face 122b opposite to the first end face 122a, a bottom surface, a top surface, and two side surfaces. The second end face 122b is inclined relative to the direction perpendicular to the top surface 1a of the substrate 1. A portion of the bottom surface of the shield 122 is opposed to the inclined portion 51b1 of the top surface 51b of the propagation part 51 with the nonmagnetic layer 30 interposed therebetween. The distance from the top surface 1a of the substrate 1 to an arbitrary point on each of the second end face 122b and the bottom surface of the shield 122 increases with increasing distance from the arbitrary point to the medium facing surface 80. The coupling layer 33 is disposed on the shield 122.

In the present embodiment, the first return path section 81 connects the main pole 131 and the shield 122 to each other so that a space is defined by the main pole 131, the shield 122 and the first return path section 81 to allow portions of the coils 17 and 38 to pass through the space.

In the present embodiment, the first end face 131a of the main pole 131 is located in the medium facing surface 80 and lies on the rear side in the direction of travel of the recording medium relative to the first end face 122a of the shield 122. The top surface 131c of the main pole 131 faces toward the shield 122. The distance between the first end face 131a of the main pole 131 and the first end face 122a of the shield 122 is preferably in the range of 50 to 300 nm and more preferably in the range of 50 to 100 nm.

In the medium facing surface 80, the near-field light generating part 51g (see FIG. 7) of the plasmon generator 50 is located between the first end face 131a of the main pole 131 and the first end face 122a of the shield 122. At least part of the plasmon generator 50 is present between the top surface 131c of the main pole 131 and the shield 122, whereas no part of the core 25 is present therebetween.

In the present embodiment, the plasmon generator 50 is greater than the top surface 131c of the main pole 131 in length in the direction perpendicular to the medium facing surface 80 (the Y direction), in particular. The plasmon exciting part of the plasmon generator 50 and the evanescent light generating surface (the top surface 25b) of the core 25 are located farther from the medium facing surface 80 than is the top surface 131c of the main pole 131.

The remainder of configuration, function and effects of the present embodiment are similar to those of the second embodiment.

Sixth Embodiment

Figure 26:
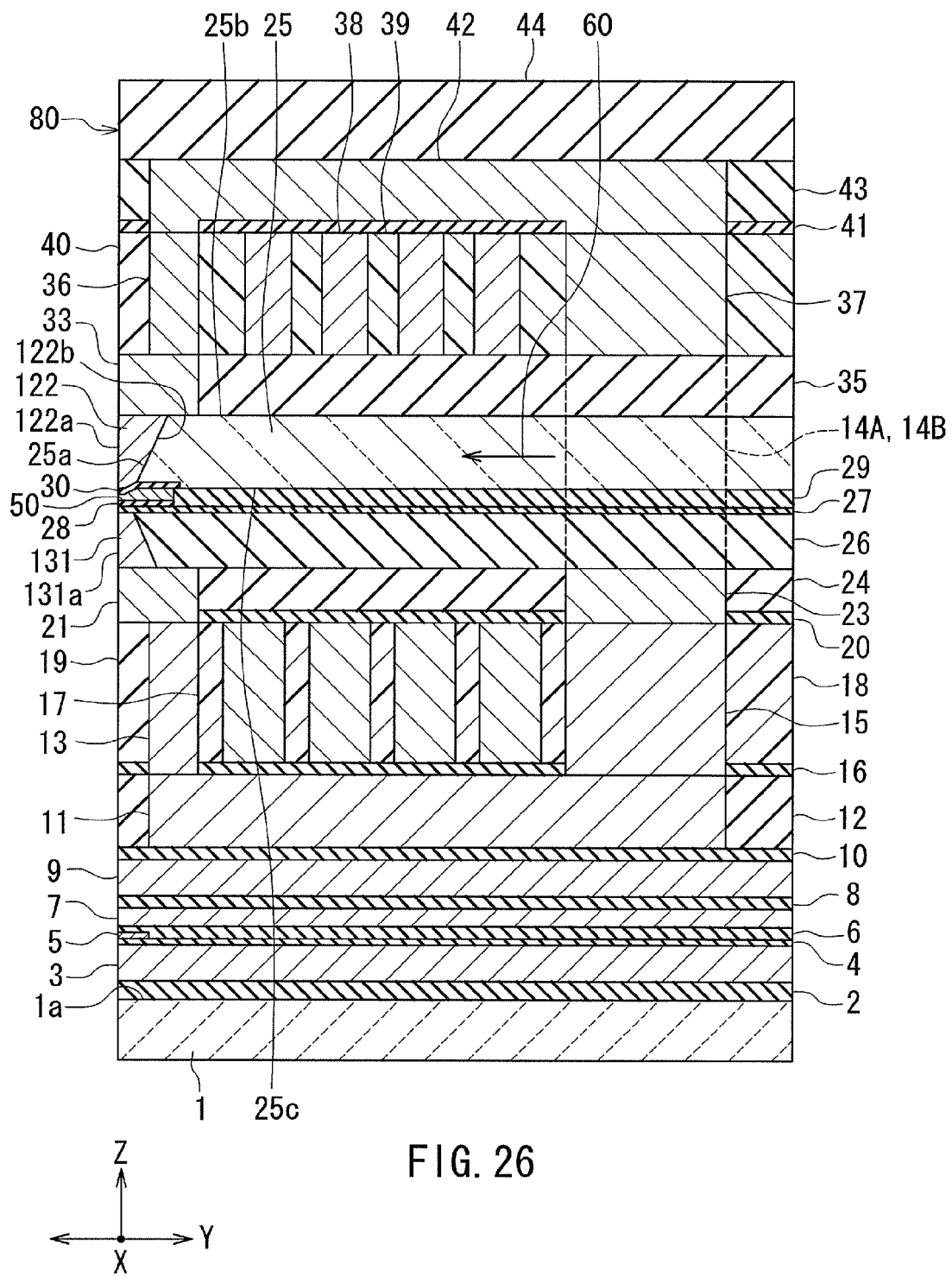
FIG. 26 is a cross-sectional view showing the configuration of a thermally-assisted magnetic recording head according to a sixth embodiment of the invention.

A thermally-assisted magnetic recording head according to a sixth embodiment of the invention will now be described with reference to FIG. 26. FIG. 26 is a cross-sectional view showing the configuration of the thermally-assisted magnetic recording head according to the present embodiment. Now, a description will be given of the differences of the thermally-assisted magnetic recording head according to the present embodiment from the thermally-assisted magnetic recording head according to the fifth embodiment.

In the thermally-assisted magnetic recording head according to the present embodiment, the core 25 is disposed at a different position from that in the fifth embodiment. In the present embodiment, the core 25 is disposed at such a position that the shield 122 is interposed between the core 25 and the medium facing surface 80. More specifically, the core 25 is disposed on the dielectric layer 29 and the nonmagnetic layer 30. The end face 25a of the core 25 is in contact with the second end face 122b of the shield 122.

The configuration described below is similar to that of the third embodiment. Part of the nonmagnetic layer 30 is interposed between the bottom surface 25c of the core 25 and the top surface of the plasmon generator 50. Parts of the two portions 471 and 472 of the nonmagnetic layer 47, the parts being apart from the medium facing surface 80 (see FIG. 6), are located on opposite sides of the core 25 in the track width direction (the X direction) and are spaced from the core 25. The dielectric layer 32 (see FIG. 15) is disposed around the core 25, the shield 122, and the nonmagnetic layer 47. The dielectric layer 35 is disposed over the core 25, the dielectric layer 32, and the nonmagnetic layer 47.

The thermally-assisted magnetic recording head according to the present embodiment includes a coupling layer 23 instead of the second layers of the coupling portions 14A and 14B. The coupling layer 23 is located on the coupling layer 15. The third layers of the coupling portions 14A and 14B are located on the coupling layer 23. The insulating layer 20 and the first cladding layer 24 surround the coupling layer 23.

The thermally-assisted magnetic recording head according to the present embodiment does not have the coupling layer 34. Instead, the coupling portions 14A and 14B have their respective fifth layers on their respective fourth layers. The fifth layers of the coupling portions 14A and 14B are embedded in the dielectric layer 35. The coupling layer 37 is disposed over the fifth layers of the coupling portions 14A and 14B and the dielectric layer 35. In the present embodiment, the first return path section 81 is constituted of the coupling layers 21 and 13, the return pole layer 11, the coupling layers 15 and 23, the coupling portions 14A and 14B, the coupling layer 37, the yoke layer 42, and the coupling layers 36 and 33.

In the present embodiment, the dielectric layers 29, 32, and 35, and the nonmagnetic layer 30 function as the cladding of the waveguide. The dielectric layers 29, 32, and 35 and the nonmagnetic layer 30 of the present embodiment are each made of a dielectric material that has a refractive index lower than that of the core 25. Examples of materials of the dielectric layers 29, 32, and 35 and the nonmagnetic layer 30 include $SiO_2$ and alumina.

The remainder of configuration, function and effects of the present embodiment are similar to those of the third or fifth embodiment.

The present invention is not limited to the foregoing embodiments, and various modifications may be made thereto. For example, as far as the requirements of the appended claims are met, the shapes and the arrangement of the core of the waveguide, the plasmon generator, the main pole, and the first and second shields can be chosen as desired, without being limited to the examples illustrated in the foregoing embodiments.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:
    a medium facing surface that faces a recording medium;
    a main pole that has an end face located in the medium facing surface and produces a write magnetic field for writing data on the recording medium;
    a waveguide including a core through which light propagates, and a cladding that surrounds the core;
    a plasmon generator having a near-field light generating part located in the medium facing surface, the plasmon generator being configured so that a surface plasmon is excited on the plasmon generator based on the light propagating through the core, and the near-field light generating part generates near-field light based on the surface plasmon; and
    a first shield made of a magnetic material, the first shield being located on a rear side in a direction of travel of the recording medium relative to the main pole, wherein:
    the first shield has: an end face that is located in the medium facing surface and lies on the rear side in the direction of travel of the recording medium relative to the end face of the main pole; and a top surface facing toward the main pole;
    the end face of the main pole and the end face of the first shield are at a distance of 50 to 300 nm from each other;
    the near-field light generating part is located between the end face of the main pole and the end face of the first shield in the medium facing surface; and
    at least part of the plasmon generator is present between the top surface of the first shield and the main pole, whereas no part of the core is present therebetween.

2. The thermally-assisted magnetic recording head according to claim 1, wherein the end face of the main pole and the end face of the first shield are at a distance of 50 to 100 nm from each other.

3. The thermally-assisted magnetic recording head according to claim 1, further comprising: a coil that produces a magnetic field corresponding to the data; and a first return path section that is made of a magnetic material and allows a magnetic flux corresponding to the magnetic field produced by the coil to pass, the first return path section connecting the main pole and the first shield to each other so that a space is defined by the main pole, the first shield and the first return path section to allow a part of the coil to pass through the space.

4. The thermally-assisted magnetic recording head according to claim 1, wherein:

the core has an evanescent light generating surface that generates evanescent light based on the light propagating through the core;

the plasmon generator has a plasmon exciting part that faces the evanescent light generating surface with a predetermined spacing therebetween; and the plasmon generator is configured so that the surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

5. The thermally-assisted magnetic recording head according to claim 4, wherein:

the plasmon generator is greater than the top surface of the first shield in length in a direction perpendicular to the medium facing surface;

the core is disposed at such a position that the first shield is interposed between the core and the medium facing surface; and the evanescent light generating surface and the plasmon exciting part are located farther from the medium facing surface than is the top surface of the first shield.

6. The thermally-assisted magnetic recording head according to claim 4, wherein the core is disposed at such a position that the main pole is interposed between the core and the medium facing surface.

7. The thermally-assisted magnetic recording head according to claim 1, further comprising a second shield made of a magnetic material, the second shield having an end face that is located in the medium facing surface and lies on a front side in the direction of travel of the recording medium relative to the end face of the main pole.

8. The thermally-assisted magnetic recording head according to claim 7, further comprising: a coil that produces a magnetic field corresponding to the data; and a first return path section and a second return path section each of which is made of a magnetic material and allows a magnetic flux corresponding to the magnetic field produced by the coil to pass, wherein:

the first return path section connects the main pole and the first shield to each other so that a first space is defined by the main pole, the first shield and the first return path section to allow a part of the coil to pass through the first space; and the second return path section connects the main pole and the second shield to each other so that a second space is defined by the main pole, the second shield and the second return path section to allow another part of the coil to pass through the second space.

9. A thermally-assisted magnetic recording head comprising:

a medium facing surface that faces a recording medium;

a main pole that has an end face located in the medium facing surface and produces a write magnetic field for writing data on the recording medium;

a waveguide including a core through which light propagates, and a cladding that surrounds the core;

a plasmon generator having a near-field light generating part located in the medium facing surface, the plasmon generator being configured so that a surface plasmon is excited on the plasmon generator based on the light propagating through the core, and the near-field light generating part generates near-field light based on the surface plasmon; and a shield made of a magnetic material, the shield being located on a front side in a direction of travel of the recording medium relative to the main pole, wherein:

the main pole further has a top surface facing toward the shield;

the shield has an end face that is located in the medium facing surface and lies on the front side in the direction of travel of the recording medium relative to the end face of the main pole;

the end face of the main pole and the end face of the shield are at a distance of 50 to 300 nm from each other;

the near-field light generating part is located between the end face of the main pole and the end face of the shield in the medium facing surface; and at least part of the plasmon generator is present between the top surface of the main pole and the shield, whereas no part of the core is present therebetween.

10. The thermally-assisted magnetic recording head according to claim 9, wherein the end face of the main pole and the end face of the shield are at a distance of 50 to 100 nm from each other.

11. The thermally-assisted magnetic recording head according to claim 9, further comprising: a coil that produces a magnetic field corresponding to the data; and a return path section that is made of a magnetic material and allows a magnetic flux corresponding to the magnetic field produced by the coil to pass, the return path section connecting the main pole and the shield to each other so that a space is defined by the main pole, the shield and the return path section to allow a part of the coil to pass through the space.

12. The thermally-assisted magnetic recording head according to claim 9, wherein:

the core has an evanescent light generating surface that generates evanescent light based on the light propagating through the core;

the plasmon generator has a plasmon exciting part that faces the evanescent light generating surface with a predetermined spacing therebetween; and the plasmon generator is configured so that the surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

13. The thermally-assisted magnetic recording head according to claim 12, wherein:

the plasmon generator is greater than the top surface of the main pole in length in a direction perpendicular to the medium facing surface;

the core is disposed at such a position that the main pole is interposed between the core and the medium facing surface; and the evanescent light generating surface and the plasmon exciting part are located farther from the medium facing surface than is the top surface of the main pole.

14. The thermally-assisted magnetic recording head according to claim 12, wherein the core is disposed at such a position that the shield is interposed between the core and the medium facing surface.

* * * * *